United States Patent
Vicenti

(10) Patent No.: US 9,630,319 B2
(45) Date of Patent: Apr. 25, 2017

(54) LOCALIZATION AND MAPPING USING PHYSICAL FEATURES

(71) Applicant: iRobot Corporation, Bedford, MA (US)

(72) Inventor: Jasper Vicenti, Boston, MA (US)

(73) Assignee: iRobot Corporation, Bedford, MA (US)

( * ) Notice: Subject to any disclaimer, the term of this patent is extended or adjusted under 35 U.S.C. 154(b) by 106 days.

(21) Appl. No.: 14/661,633

(22) Filed: Mar. 18, 2015

(65) Prior Publication Data

US 2016/0271795 A1 Sep. 22, 2016

(51) Int. Cl.
B25J 9/16 (2006.01)

(52) U.S. Cl.
CPC ............ *B25J 9/163* (2013.01); *B25J 9/1664* (2013.01); *B25J 9/1666* (2013.01); *Y10S 901/01* (2013.01)

(58) Field of Classification Search
CPC . B25J 9/163; B25J 9/003; B25J 9/1664; B25J 9/1666; G05D 1/0242; G05D 1/0238; G05D 1/0255; G05D 1/0272; G01C 21/00; G01C 21/005; G01C 21/14
See application file for complete search history.

(56) References Cited

U.S. PATENT DOCUMENTS

| | | | |
|---|---|---|---|
| 6,389,329 B1 | 5/2002 | Colens | |
| 6,532,404 B2 | 3/2003 | Colens | |
| 6,594,844 B2 | 7/2003 | Jones | |
| 6,690,134 B1 | 2/2004 | Jones et al. | |
| 6,781,338 B2 | 8/2004 | Jones et al. | |
| 6,809,490 B2 | 10/2004 | Jones et al. | |
| 6,965,209 B2 | 11/2005 | Jones et al. | |
| 7,135,992 B2 | 11/2006 | Karlsson et al. | |
| 7,155,308 B2 | 12/2006 | Jones | |
| 7,173,391 B2 | 2/2007 | Jones et al. | |

(Continued)

FOREIGN PATENT DOCUMENTS

| | | |
|---|---|---|
| WO | 2013138574 | 9/2013 |
| WO | 2014047465 | 3/2014 |
| WO | 2014151408 | 9/2014 |

OTHER PUBLICATIONS

International Search Report and Written Opinion in International Application No. PCT/US15/61079, mailed Feb. 2, 2016, 12 pages.

(Continued)

*Primary Examiner* — Adam Mott
(74) *Attorney, Agent, or Firm* — Fish & Richardson P.C.

(57) ABSTRACT

A method includes maneuvering a robot in (i) a following mode in which the robot is controlled to travel along a path segment adjacent an obstacle, while recording data indicative of the path segment, and (ii) in a coverage mode in which the robot is controlled to traverse an area. The method includes generating data indicative of a layout of the area, updating data indicative of a calculated robot pose based at least on odometry, and calculating a pose confidence level. The method includes, in response to the confidence level being below a confidence limit, maneuvering the robot to a suspected location of the path segment, based on the calculated robot pose and the data indicative of the layout and, in response to detecting the path segment within a distance from the suspected location, updating the data indicative of the calculated pose and/or the layout.

20 Claims, 8 Drawing Sheets

(56) References Cited

U.S. PATENT DOCUMENTS

| | | | |
|---|---|---|---|
| 7,196,487 B2 | 3/2007 | Jones et al. | |
| 7,211,980 B1* | 5/2007 | Bruemmer | G05D 1/0214 |
| | | | 318/567 |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,571,511 B2 | 8/2009 | Jones et al. | |
| 7,636,982 B2 | 12/2009 | Jones et al. | |
| 7,761,954 B2 | 7/2010 | Ziegler et al. | |
| 8,301,374 B2 | 10/2012 | Surampudi et al. | |
| 8,781,630 B2 | 7/2014 | Banks et al. | |
| 8,788,205 B2 | 7/2014 | Lin et al. | |
| 8,798,840 B2 | 8/2014 | Fong et al. | |
| 8,868,237 B2 | 10/2014 | Sandin et al. | |
| 8,881,339 B2 | 11/2014 | Gilbert et al. | |
| 9,004,553 B2 | 4/2015 | Hickey et al. | |
| 9,020,637 B2 | 4/2015 | Schnittman | |
| 2002/0016649 A1 | 2/2002 | Jones | |
| 2002/0120364 A1 | 8/2002 | Colens | |
| 2003/0025472 A1 | 2/2003 | Jones et al. | |
| 2004/0020000 A1 | 2/2004 | Jones | |
| 2004/0049877 A1 | 3/2004 | Jones et al. | |
| 2004/0187457 A1 | 9/2004 | Colens | |
| 2004/0207355 A1 | 10/2004 | Jones et al. | |
| 2004/0220707 A1 | 11/2004 | Pallister | |
| 2005/0067994 A1 | 3/2005 | Jones et al. | |
| 2005/0085947 A1* | 4/2005 | Aldred | G05D 1/0242 |
| | | | 700/253 |
| 2005/0204717 A1 | 9/2005 | Colens | |
| 2005/0234679 A1 | 10/2005 | Karlsson | |
| 2007/0266508 A1 | 11/2007 | Jones et al. | |
| 2008/0140255 A1 | 6/2008 | Ziegler et al. | |
| 2008/0155768 A1 | 7/2008 | Ziegler et al. | |
| 2008/0307590 A1 | 12/2008 | Jones et al. | |
| 2010/0049365 A1 | 2/2010 | Jones et al. | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2011/0167574 A1 | 7/2011 | Stout et al. | |
| 2011/0202175 A1* | 8/2011 | Romanov | A47L 11/4011 |
| | | | 700/250 |
| 2011/0279652 A1 | 11/2011 | Eggert et al. | |
| 2012/0121161 A1 | 5/2012 | Eade et al. | |
| 2013/0138247 A1 | 5/2013 | Gutmann et al. | |
| 2013/0204465 A1 | 8/2013 | Phillips et al. | |
| 2013/0244688 A1 | 9/2013 | Huang et al. | |
| 2013/0331987 A1 | 12/2013 | Karlsson et al. | |
| 2014/0032033 A1 | 1/2014 | Einecke et al. | |
| 2014/0277691 A1 | 9/2014 | Jacobus et al. | |
| 2014/0368664 A1 | 12/2014 | Yagcioglu et al. | |
| 2014/0379296 A1 | 12/2014 | Nathan et al. | |
| 2015/0046018 A1 | 2/2015 | Hayashi et al. | |

OTHER PUBLICATIONS

Aly et al., "CompactKdt: Compact Signatures for Accurate Large Scale Object Recognition," Applications of Computer Vision (WACV), 2012 IEEE Workshop on, Jan. 2012, pp. 505-512.

Goel et al., "Systematic Floor Coverage of Unknown Environments Using Rectangular Regions and Localization Certainty," Intelligent Robots and Systems (IROS), 2013 IEEE/RSJ International Conference on, Nov. 2013, pp. 1-8.

Goncalves et al., "A Visual Front-end for Simultaneous Localization and Mapping," Proceedings of the 2005 IEEE International Conference on Robotics and Automation, Apr. 2005, pp. 44-49.

Gutmann et al., "A Constant-Time Algorithm for Vector Field SLAM Using an Exactly Sparse Extended Information Filter," Robotics: Science and Systems (RSS), 2010, pp. 1-8.

Gutmann et al., "Challenges of Designing a Low-Cost Indoor Localization System Using Active Beacons," Technologies for Practical Robot Applications (TePRA), 2013 IEEE International Conference on, Apr. 2013, pp. 1-6.

Gutmann et al., "Localization in a Vector Field Map," Intelligent Robots and Systems (IROS), 2012 IEEE/RSJ International Conference on, Oct. 2012, pp. 3144-3151.

Gutmann et al., "The Social Impact of a Systematic Floor Cleaner," Advanced Robotics and its Social Impacts (ARSO), 2012 IEEE Workshop on, May 2012, pp. 50-53.

Gutmann et al., "Vector Field SLAM," Robotics and Automation (ICRA), 2010 IEEE International Conference on, May 2010, pp. 236-242.

Jeong and Lee, "CV-SLAM: A new Ceiling Vision-based SLAM technique," Intelligent Robots and Systems, 2005. (IROS 2005). 2005 IEEE/RSJ International Conference on, Aug. 2005, pp. 3195-3200.

Karlsson et al., "The vSLAM Algorithm for Navigation in Natural Environments," Korean Robotics Society Review 2 (2005), 2005, pp. 51-67.

Munich et al., "Application of Visual Pattern Recognition to Robotics and Automation," IEEE Robotics & Automation Magazine, Sep. 2006, pp. 72-77.

Munich et al., "SIFT-ing Through Features with ViPR," IEEE Robotics & Automation Magazine, vol. 13, issue 3, Sep. 2006, pp. 72-77.

Yamamoto et al., "Optical Sensing for Robot Perception and Localization," Advanced Robotics and its Social Impacts, 2005. IEEE Workshop on, Jun. 2005, pp. 14-17.

* cited by examiner

LOCALIZATION AND MAPPING USING PHYSICAL FEATURES

TECHNICAL FIELD

The invention generally relates to navigation of mobile devices. In particular, the invention relates to localization and mapping techniques that can be used in mobile devices such as mobile robots.

BACKGROUND

Localization techniques of mobile robots can include processes that allow a robot to determine its position and orientation (or "pose") with respect to its surroundings. A robot that can build a map of its surroundings can localize itself within the map to exhibit a degree of autonomy. This process of building a map and using the generated map is known as Simultaneous Localization and Mapping (SLAM). SLAM relates to the building of a map (mapping) and the use of the map (localizing), and therefore includes a process associated with localization and a process associated with mapping. The robot can execute these processes simultaneously or in a multiplexed fashion. SLAM techniques can include building a map using odometry, mechanical contact sensors or non-contact ranging sensors such as a laser rangefinder or image based sensor.

SUMMARY

One aspect of the invention features a method of navigating an autonomous robot within an area at least partially enclosed by walls. The method includes maneuvering the robot in a following mode in which the robot is controlled to travel along a path segment adjacent an obstacle, while recording data indicative of the path segment. The method further includes maneuvering the robot in a coverage mode in which the robot is controlled to traverse the area while performing a function. While maneuvering the robot in the coverage mode, the method further includes generating data indicative of a physical layout of the area, updating data indicative of a calculated robot pose based at least on robot odometry data, calculating a robot pose confidence level. The data indicative of the physical layout of the area includes area boundaries and obstacle perimeters detected while performing the function. The calculated robot pose includes a calculated location and orientation of the robot within the area. The method further includes, in response to the robot pose confidence level being below a predetermined confidence limit, maneuvering the robot to a suspected location of the path segment, based on the calculated robot pose and the data indicative of the physical layout of the area and then, in response to detecting an obstacle within a predetermined distance from the suspected location of the path segment, updating at least one of the data indicative of the calculated robot pose the data indicative of the physical layout of the area, thereby updating a relative pose of the robot within the area.

In some examples, the method further includes selecting the suspected location of the path segment maneuvered to based on a time differential from a first traversal of the suspected location of the path segment. The method may also include selecting the suspected location of the path segment maneuvered to based on a distance differential from a first traversal of the suspected location of the path segment. The method may include building a library of path segments in the wall following mode, and wherein in response to the robot pose confidence level falling to below the predetermined confidence limit, the robot is maneuvered to a suspected location of a path segment selected as a function of its suspected relative position with respect to the robot.

In some cases, the method includes building a library of path segments based on the data indicative of the physical layout of the area, and wherein in response to the robot pose confidence level falling to below the predetermined confidence limit, the robot is maneuvered to a suspected location of a path segment from the library of path segments selected as a function of its suspected relative position with respect to the robot. The method may include, after updating either of the data indicative of calculated robot location and the data indicative of the physical layout of the area, again maneuvering the robot in the coverage mode. The method may include, in response to detecting an obstacle while maneuvering the robot in the coverage mode, initiating the following mode.

In some examples, updating the data indicative of the calculated robot pose relative to the data indicative of the physical layout of the area re-localizes two or more segments to the data indicative of the physical layout of the area. Updating the data indicative of the calculated robot pose relative to the data indicative of the physical layout of the area may re-localize the data indicative of the robot pose to the data indicative of the physical layout of the area. Recording the data indicative of the path segment may include collecting data from a sensor on the robot. Comparing the data may include comparing at least one of path lengths, starting poses of the data, ending poses of the data, straight distances traveled, and curvatures. Detecting the obstacle may include physically contacting the detected obstacle. Generating data indicative of the physical layout of the area may include analyzing image data from a camera on the robot.

In some cases, the sensor is at least one of an odometer, a radiation transceiver, a bump sensor, a pressure sensor, and a proximity sensor.

In some cases, the function may include cleaning a floor within the area.

In some implementations, after maneuvering the robot to the suspected location of the path segment, the method further comprises maneuvering the robot in the following mode to follow the detected obstacle while recording robot pose data, and from the recorded robot pose data, generating data indicative of a path of the robot along the detected obstacle. Updating the data indicative of calculated robot pose may include comparing the data indicative of the path of the robot along the detected obstacle to the data indicative of the path segment recorded in the following mode, to determine whether the path of the robot along the detected obstacle sufficiently matches the path segment recorded in the following mode, and upon determining a sufficient match, updating either of the data indicative of calculated robot location and the data indicative of the physical layout of the area, in accordance with the sufficiently matched path segment.

Implementations of the robotic system can include one or more of the following features. The robotic system can estimate the pose of the robot by tracking odometry and can estimate its confidence in the pose estimation using other on-board sensors. The robotic system can then generate a map of an environment by using the pose estimations. The odometry of the drive system of the robot can be used to estimate the pose. Since odometry data can be subject to drift and error, other sensors on the robot can be used to correct for drift and error or estimate drift and error. The accelerometers and gyroscopes on the robot can sense linear and angular accelerations to estimate the error accumulating as the robot navigates. The robotic system can compute a confidence for each instance that the robotic system estimates a pose. Therefore, over time, the robotic system can determine an appropriate time to restore the confidence by re-localizing the robot to the environment.

The robot can use physical interaction with the environment that occurs during navigation to generate data for re-localizing itself to the environment. For example, when the robot navigates around an environment and executes behaviors to cover and clean the environment, the robot can bump into obstacles, follow walls, or interact in other ways with the physical elements of the environment. The robot can record these physical interactions, which occur as part of the navigational behavior of the robot, to designate unique physical landmarks present in the environment. The unique landmarks can then be used to re-localize the robot when the robot determines that its confidence in its pose has decreased to below the pre-defined confidence limit.

The features of the robotic system above can include one or more advantages. Using sensors already conventionally present on mobile robots, such as encoders, bumper sensors, gyroscopes, and accelerometers, decreases the cost of the robotic system and increases the overall manufacturability. For example, the robotic system uses the sensors used for navigation to generate the data for SLAM, thus preventing the need for additional sensors specific for SLAM. The electromechanical systems remain simpler with fewer components.

Furthermore, the data collected by the sensors are computationally inexpensive. For example, as opposed to using large file sized images typical of VSLAM, the SLAM system implemented in the robotic system requires less storage. In a conventional SLAM robotic system, there may be separate sensors for mapping, localization, and navigation. The amount of data generated and stored by these sensors can be computationally expensive. In fact, these systems may only be able to store a fraction of the amount of data collected over the use of the robot. The SLAM systems described in this application can advantageously collect a greater amount of data at a better efficiency. The systems can also efficiently facilitate re-localization of the robot by comparing less complex data during re-localization.

The details of one or more implementations are set forth in the accompanying drawings and the written description. Other features, objects, and advantages will be apparent from the description, drawings, and the claims.

DESCRIPTION OF DRAWINGS

Like reference symbols in the various drawings indicate like elements.

DETAILED DESCRIPTION

Figure 1A:
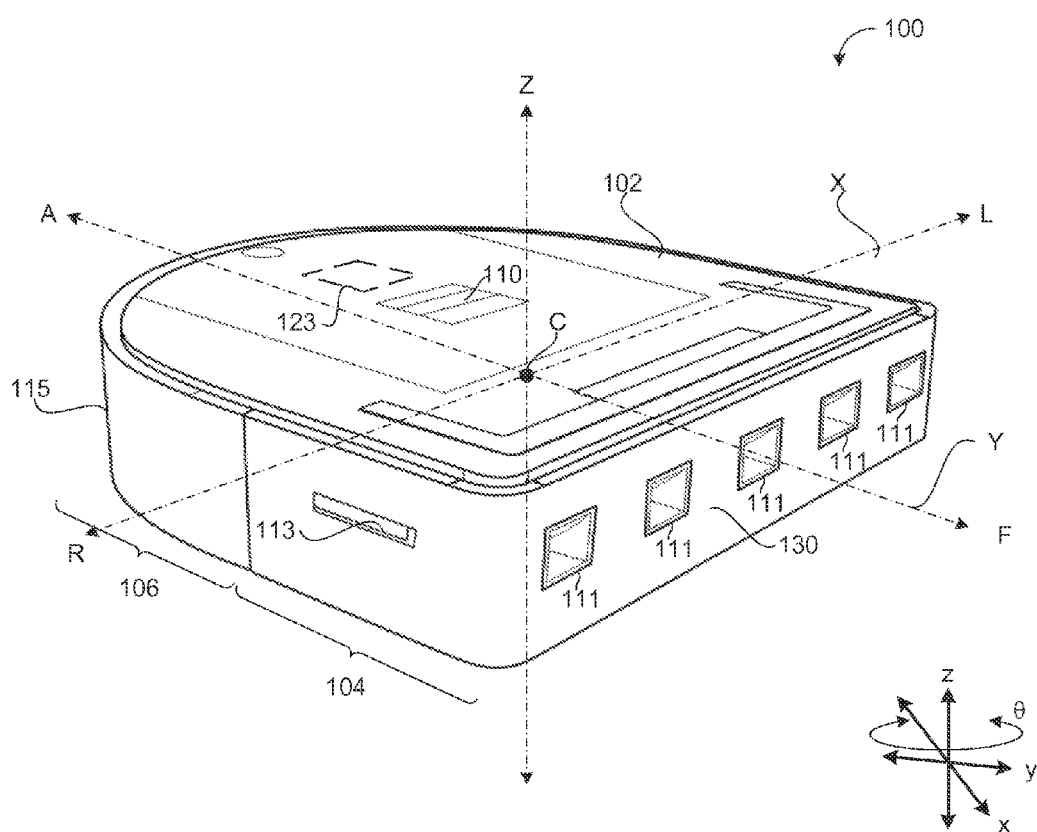
FIG. 1A shows a perspective view of an autonomous robot.

An autonomous robot intelligently navigates about a room using simultaneous localization and mapping (SLAM) techniques. The robot can localize by sensing natural features of the room. The robot can use one or more visual sensors and one or more dead reckoning sensors to process data pertinent to SLAM and to autonomously generate and update a map. A controller of the robot operates a sensor system to continuously estimate the pose of the robot within the room as the robot moves around and to receive information about the room. A "pose" herein includes a position of the robot within the room (e.g., an x, y coordinate location) and an angular orientation of the robot relative to, for example, a wall in the room or a cardinal direction. A sensed "feature" herein describes information and data collected from physical elements of the environment. For example, a feature can correspond to a geometric contour sensed by the robot as the robot navigates around physical elements of the environment.

In some examples of intelligent navigation of the robot, the robot generates templates, or landmarks, corresponding to one or more features of the environment that the robot can detect using, e.g., sensors on the robot. The robot builds a map of a physical layout of the environment (e.g., one or more rooms or sections within a room), the physical layout including unique landmarks (herein also referred to as "signatures") that include the one or more features. The robot estimates its pose within the environment and reduces the error in pose estimation using the generated templates. As the robot follows obstacles (e.g., furniture and fixtures) and walls within the environment, the robot can generate the templates of path segments corresponding to a unique combination of features that identify a particular arrangement and location of obstacles and/or walls. The features stored in the templates include a compilation of sensor data from the sensors that identifies each unique path segment.

For example, the sensor data can include geometry (sensed by non-contact rangefinding sensors, e.g. volumetric point cloud sensors, IR point and line ranging sensors and sonar), bump sensor data, image data, and other data generated by sensors of the sensor system. Second, as the robot moves about the room, the robot generates data indicative of a physical layout of the room that the controller uses to produce a virtual map or occupancy grid stored on a memory storage element. As the occupancy grid is generated, the controller tracks and continuously updates data indicative of the pose of the robot within the occupancy grid. The data indicative of the pose can be an estimate that increases in error as the robot continues to move about the room. In some examples, the robot represents the error as a measure of confidence associated with the estimated pose. In other examples, the robot represents the error as a measure of uncertainty associated with the estimated pose. Finally, the robot can decrease the uncertainty or increase the confidence in its pose estimation by moving the robot to a suspected location of one of the path segments described above. Upon reaching the path segment, the sensor system of the robot can generate signals corresponding to its movement around the suspected location of the path segment. The robot implements a template matching algorithm to determine if the generated sensor data matches the template corresponding the path segment generated earlier. If the sensor data matches the template, the controller can re-orient the occupancy grid by confirming the pose of the robot or relocalizing the robot based on the position of the template within the room, and thus restore confidence in the pose estimation.

Overview of Robot

Referring to FIG. 1A, robot 100 includes a body 102, a forward portion 104, and a rearward portion 106. The robot 100 can move across a floor surface of a physical environment through various combinations of movements relative to three mutually perpendicular axes defined by the body 102: a transverse axis X, a fore-aft axis Y, and a central vertical axis Z. A forward drive direction along the fore-aft axis Y is designated F (referred to hereinafter as "forward"), and an aft drive direction along the fore-aft axis Y is designated A (referred to hereinafter as "rearward"). The transverse axis X extends between a right side R and a left side L of the robot 100 substantially along an axis defined by center points of, referring briefly to FIG. 1B, wheel modules 108a, 108b. In some implementations, the robot 100 has a round circumference. In other implementations, the forward portion 104 generally has a rectangular cross section and the rearward portion 106 is generally rounded, having a semicircular cross section. Other geometric shapes of the robot body 102 are contemplated, such as a Reuleaux triangle or constant width polygon.

A user interface 110 disposed on a top portion of the body 102 receives one or more user commands and/or displays a status of the robot 100. One or more obstacle detection sensors 111 disposed on the forward portion 104 evaluate the distance of obstacles to the robot 100. In one implementation, the one or more sensors are point ranging time of flight sensors, line ranging sensors or volumetric point cloud sensors. In another implementation, the one or more obstacle detection sensors 111 are sonar sensors disposed on the forward portion 104 serve as transducers of ultrasonic signals to evaluate the distance of obstacles to the robot 100. A wall following sensor 113 on the right side of the robot 100 is an IR sensor that can determine when the robot 100 is following a wall. The left side L of the robot 100 can also have a wall following sensor. The forward portion 104 of the body 102 further carries a bumper 115, which detects obstacles in a drive path of the robot 100.

Figure 1B:
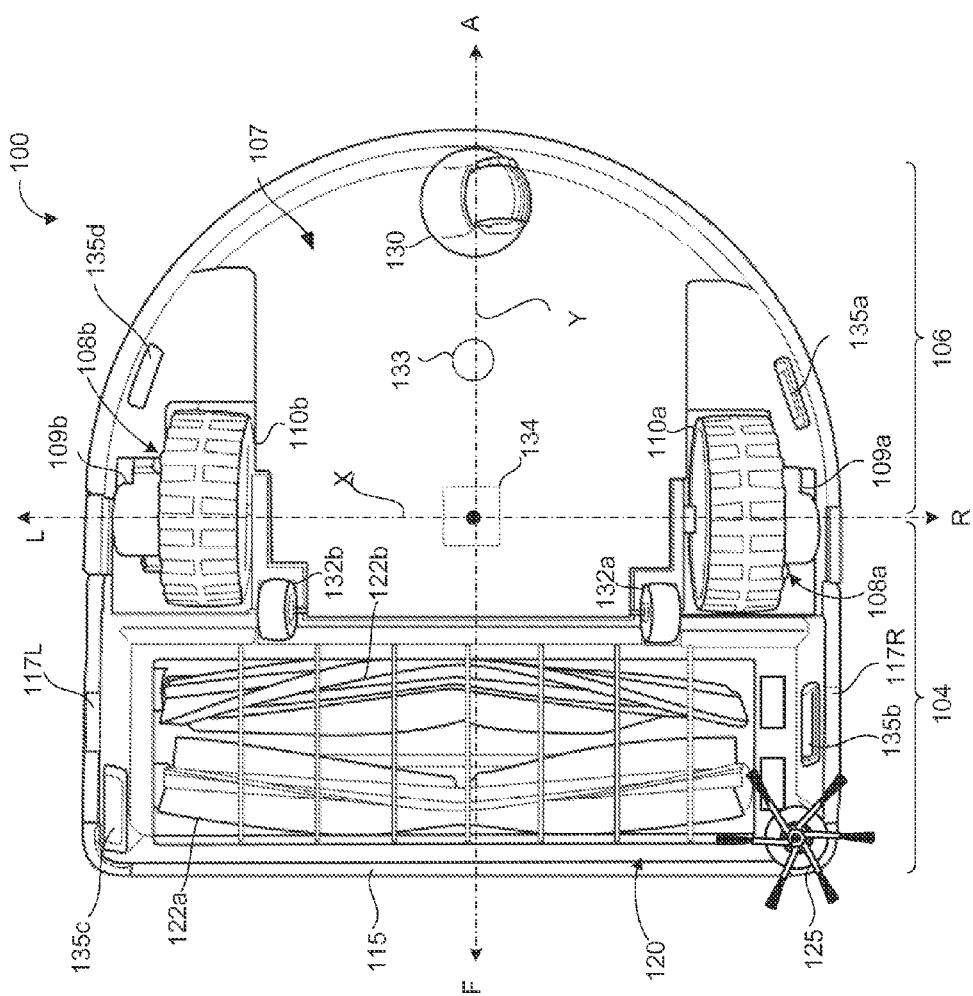
FIG. 1B shows a bottom view of the autonomous robot of FIG. 1A.

Referring to FIG. 1B, a bottom surface 107 of the robot 100 includes the wheel modules 108a-b with motors 109a-b that differentially drive wheels 110a-b. The motors 109a-b are coupled to rotary encoders 112a-b. The bottom surface 107 of the robot 100 further includes a cleaning head 120 with a front roller 122a and a rear roller 122b, a side brush 125, a caster wheel 130, clearance regulators 132a-b, an optical mouse sensor 133, an inertial measurement unit (IMU) 134, and cliff sensors 135a-135d.

The wheel modules 108a and 108b, located along the transverse axis X, propel the robot 100 across the floor surface during a cleaning routine. The motors 109a-b drive their respective wheels 110a-b. As the motors 109a-b drive the wheels 110a-b, the rotary encoders 112a-b measure the position of the motor shaft of the motors 109a-b. As will be discussed below, an odometry system uses the rotary encoders 112a-b to estimate the distance travelled by the robot 100.

As the robot 100 moves in the forward direction F and contacts obstacles within the environment, the bumper 115 disposed on the forward portion 104 of the robot 100 detects the contact and produces a signal in response to contacting the obstacles. In some implementations, the bumper 115 is a solid state tactile sensing bumper that can detect physical or electrical characteristics upon contacting an obstacle. In some cases, the bumper 115 may encompass some or all of the sides and reward portion of the robot. For example, the bumper 115 may include a contact sensor membrane that senses applied force and the contact sensor membrane may be applied around some or all of the periphery of the robot 100 such that contact with physical structures of the environment are sensed in any direction of movement. In these implementations, the robot 100 can use the location of contact along the contact sensor membrane of the bumper 115 to avoid an obstacle or perform WALL FOLLOWING behavior. In another implementation, the bumper 115 includes a capacitive bumper sensor disposed along front and side surfaces of the bumper 115. In some cases, the capacitive bumper sensor can be disposed upward along a top surface of the bumper 115 so that the capacitive bumper sensor can sense contact with surfaces from additional directions (e.g., from above the robot). Examples of bumpers are disclosed in U.S. patent application Ser. No. 14/277,270, titled "Compliant Solid-State Bumper for Robot," incorporated by reference herein in its entirety.

In another implementation, the bumper 115 is a moveable member and includes one or more mechanical switches such that contact with obstacles in the environment triggers the bumper switches 117L and 117R. The bumper switch 117R is located on the right side R of the robot 100. The bumper switch 117L is located on the left side L of the robot 100. The two bumper switches 117L and 117R are located forward of the wheels 110a-b relative to the forward drive direction F. In some cases, when the robot 100 contacts a landmark, more than one of the bumper switches 117L and 117R can be triggered sequentially. The robot 100 can use the sequential actuation of the bumper switches 117R and 117L to avoid an obstacle or perform WALL FOLLOWING behavior.

The removable cleaning head 120 is mounted on the forward portion of the chassis and includes two counter rotating rollers mounted therein, front roller 122a and rear roller 122b, for retrieving debris from a cleaning surface. The robot body 102 includes a side brush 125, or corner brush, disposed on the bottom forward portion 104 of the robot body 102. The side brush 125 sits on a lateral side of the forward portion 104 of the body 102. The front roller 122a and the rear roller 122b cooperate with the side brush 125 to clean the floor of the region by ingesting debris redirected into the path of the front roller 122a and rear roller by the 122b by the side brush 125 which extends beyond the perimeter of the robot body 102 to ensnare debris in crevices and along edges beyond the reach of the cleaning head 120.

The caster wheel 130 supports the rearward portion 106 of the robot body 102 such that the cantilevered cleaning head 120 is biased toward the cleaning surface. In some implementations, the caster wheel 130 swivels and is vertically spring-loaded to bias the caster wheel 130 to maintain contact with the floor surface, and a sensor in the caster wheel 130 can detect if the robot 100 is no longer in contact with a floor surface (e.g. when the robot 100 backs up off a stair allowing the vertically spring-loaded swivel caster wheel 130 to drop). The clearance regulators 132a-b, rotatably supported by the robot body 102, maintain a minimum clearance height (e.g., at least 2 mm) between the bottom surface of the body 102 and the floor surface.

The bottom of the robot body 102 includes the optical mouse sensor 133. The optical mouse sensor includes a light source and a low-resolution camera. The light source illuminates the floor beneath the robot body 102 as the robot navigates about the environment, and the low-resolution camera continuously records and compares sequential low-resolution images (e.g., about 20×20 pixels) of the floor. As will be described later, the robot 100 uses the optical mouse sensor 133 to estimate drift in the x and y directions as the robot 100 navigates about the environment.

The robot body 102 further houses an IMU 134. In implementations, the IMU includes a 3-axis accelerometer and a 3-axis gyroscope. The 3-axis accelerometer measures x, y, and z acceleration, and the 3-axis gyroscope measures rotation about the x-, y-, and z-axes (e.g., pitch, yaw, and roll). As will be described below, the accelerator of the IMU 134 can be used to estimate drift in the x and y directions, and the gyroscope of the IMU 134 can be used to estimate drift in the orientation θ of the robot 100.

The robot 100 includes multiple cliff sensors 135a-d located near the forward and rear edges of the robot body 102, behind the drive wheels 110a-b at a distance that enables the robot 100 to receive a cliff sensor signal and have time to stop the wheels 110a-b before moving off a sensed drop. Cliff sensors 135b and 134c are located on the forward portion 104 near the front surface of the robot and cliff sensors 135a and 135d are located on a rearward portion 106. Each cliff sensor 135a-d is disposed near one of the side surfaces so that the robot 100 can detect an incoming drop or cliff from either side of its body 102. Each cliff sensor 135a-d emits radiation, e.g. infrared light, and detects a reflection of the radiation to determine the distance from the cliff sensor 135a-d to the surface below the cliff sensor 135a-d. A distance larger than the expected clearance between the floor and the cliff sensor 135a-d, e.g. greater than 2 mm, indicates that the cliff sensor 135a-d has detected a cliff-like obstacle or environmental element in the floor topography.

The hardware of the robot herein can include aspects of the robotic system disclosed in application no. PCT/US2014/025665 filed on Mar. 13, 2014 and titled "Roller brush for surface cleaning robots" and U.S. application Ser. No. 13/460,261 filed on Apr. 30, 2012 and titled "Robotic Vacuum," both of which are hereby incorporated by reference in its entirety.

Control Systems Hardware

Figure 1C:
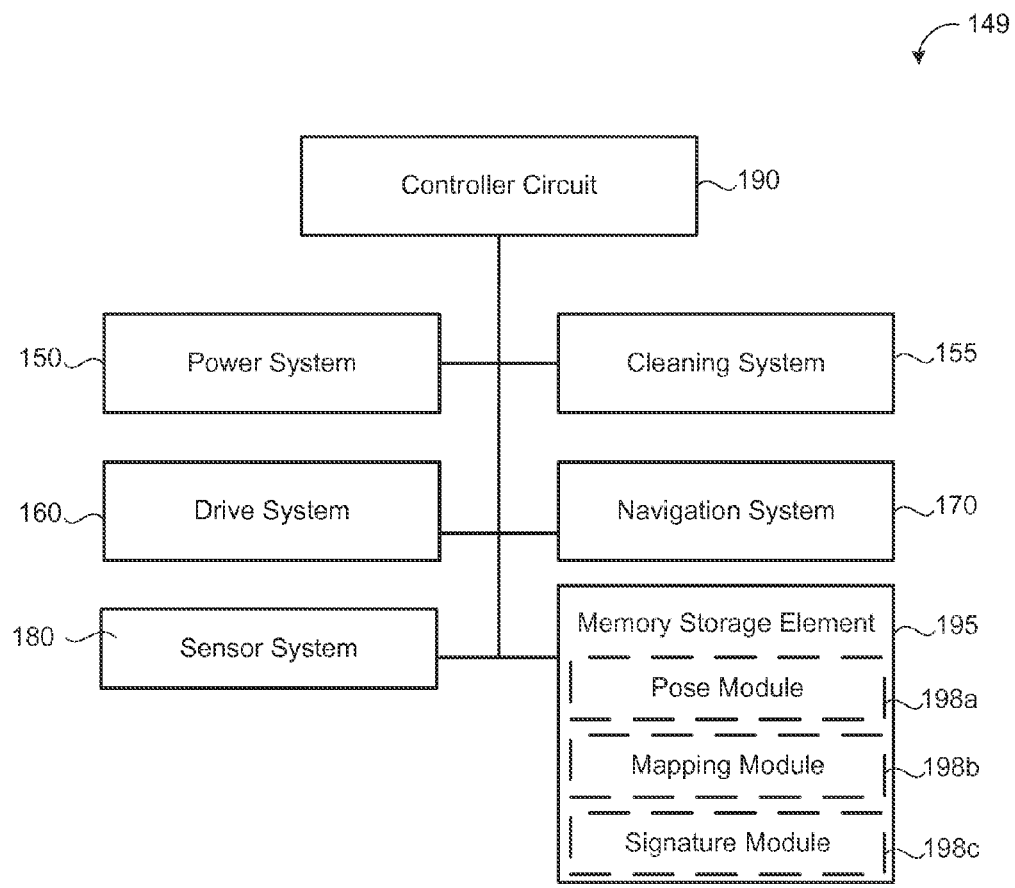
FIG. 1C shows a block diagram of a control system implemented on the autonomous robot of FIGS. 1A-B.

Now also, referring to FIG. 1C, the body 102 of the robot 100 houses a control system 149 that includes a power system 150, a cleaning system 155, a drive system 160, a navigation system 170, a sensor system 180, a controller circuit 190 (herein also referred to as "controller 190"), and a memory storage element 195. The power system 150, which includes a power source, provides electric power to the systems operable with the robot 100. The power system 150 can further include a charging system within the power system 150 that is connectable to an external charging dock to charge the power source. The cleaning system 155 uses rollers 122a-b, the side brush 125, and a debris bin fan 123 housed in the robot body 102 to ingest debris.

The drive 160 can maneuver the robot 100 across the floor surface based on a drive command having x, y, and θ components (shown in FIG. 1A). The drive 160 controls motors 109a, 109b to drive wheels 110a-b of the wheel modules 108a-b such that the wheel modules 108a-b can propel the robot 100 in any drive direction along the floor surface. The wheel modules can be differentially operated such that the robot can turn based on a level of drive supplied to each drive wheel 110a-b. Independent motors 109a, 109b of the wheel modules 108a-b drive each wheel 110a-b such that the wheels 110a-b can rotate independently from one another. As a result, independent rotation of the wheels 110a-b can rotate the forward drive direction F of the robot 100 to a new heading.

The navigation system 170, a behavior-based system executed on the controller 190, can send instructions to the drive system 160 so that the robot 100 can use the drive 160 to navigate an environment. The navigation system 170 communicates with the sensor system 180 to issue drive commands to the drive 160.

In implementations, the sensor system 180 includes sensors disposed on the robot 100, such as the obstacle detection sensors 111, the wheel encoders 112a-b, the bumper switches 117L and 117R, the optical mouse sensor 133, the IMU 134, and the cliff sensors 135a-e. Some or all of the sensors of the sensor system 180 generate data related to features of structural elements in the environment, thereby enabling the navigation system 170 determine a mode or behavior to use to navigate about the environment for complete coverage of a room or cell or for avoiding a potential hazard, such as a low overhang that would render a wedged condition or a lamp base that would render a beached condition. One or more of the various sensors of the sensor system 180 can be used to generate data related to one or more features or landmarks. The sensor system 180 creates a perception of the robot's environment sufficient to allow the robot 100 to make intelligent decisions about actions (e.g., navigation actions, drive actions) to take within the environment. The sensor system 180 gathers the data to allow the robot 100 to implement SLAM techniques, as will be described later.

The sensor system 180 can include obstacle detection obstacle avoidance (ODOA) sensors, ranging sonar sensors, proximity sensors, radar sensors, LIDAR (Light Detection And Ranging, which can entail optical remote sensing that measures properties of scattered light to find range and/or other information of a distant target) sensors, clearance sensors operable with the clearance regulators 132a-b, a camera (e.g., volumetric point cloud imaging, three-dimensional (3D) imaging or depth map sensors, visible light camera and/or infrared camera), wheel drop sensors operable with the caster wheel 130 that can detect movement of the caster wheel 130. The sensor system can also include communication sensors, navigation sensors, contact sensors, a laser scanner, and other sensors to facilitate navigation, detection of obstacles, and other tasks of the robot 100. The proximity sensors can take the form of contact sensors (e.g. a sensor that detects an impact of a bumper on the robot with a physical barrier, such as a capacitive sensor or a mechanical switch sensor) and/or LIDAR sensors that detect when the robot is in close proximity to nearby objects.

The controller 190 operates the other systems of the robot 100 by communicating with each system, providing and receiving input and output parameters. The controller 190 facilitates communication between the power system 150, the cleaning system 155, the drive system 160, navigation system 170, the sensor system 180, and the memory storage element 195. For instance, the controller 190 can instruct the power system 150 to provide electrical power to the motors of the drive system 160 to move the robot 100 in the forward drive direction F. The controller 190 can also instruct the power system 150 to enter a power charging mode. The controller 190 can instruct the power system 150 to provide a specific level of power (e.g., a percent of full power) to individual systems.

The controller 190 can redirect the wheel modules 108a-b of the drive system 160 in response to, for example, signals received from the navigation system 170 and the sensor system 180. The controller 190 operates the navigation system 170 to maneuver the robot 100 in a path or route through the environment. The navigation system 170 can deliver instructions to the robot controller 190 to maneuver the robot 100 in any direction across the environment by independently controlling the rotational speed and direction of each wheel module 108a-b of the drive system 160. For example, the robot controller 190 can maneuver the robot 100 in the forward direction F, rearward direction A, right direction R, and left direction L. The robot controller 190 can maneuver the robot 100 to rotate substantially in place such that the robot 100 can maneuver away from or along an obstacle, wall, or other structural element of the environment. The robot controller 190 can direct the robot 100 over a substantially random (e.g., pseudo-random) path while traversing the floor surface or, in SLAM or VSLAM enabled robots, in a deterministic cleaning pattern.

Using the controller 190, the robot 100 can respond to events, such as contacting obstacles and walls within an area, detected by the bumper 115. A response can include using the navigation system 170 and drive system 160 to control the wheel modules 108a-b to maneuver the robot 100 in response to the event. The robot 100 can, for example, move away from an obstacle or along a path adjacent to the obstacle.

In some implementations, the controller 190 can include obstacle detection and avoidance methods and behaviors implemented in response to actuation of the bumper switch 117L and 117R. The robot can use the bumper switches 117L and 117R to detect the general location of an obstacle in the general vicinity of the robot 100 so that the robot 100 can determine the direction to turn to avoid the obstacle. Using the bumper switches 117L and 117R disposed on the front portion of the robot 100, the controller 190 can determine when the robot contacts an obstacle and communicate instructions to the navigation system 170 and the drive system 160 to avoid the obstacle. When the robot 100 contacts an obstacle that actuates the bumper switches 117L and 117R, in addition to determining when the robot 100 has contacted an obstacle, the controller 190 can further estimate an angle relative to the contact point between the robot 100 and the obstacle by calculating a time difference between the activation of the left and right bumper switches 117L and 117R, if both are activated. The robot is then able to estimate the angle at which contact was made. When the bumper 115 is contacted from the right side, the right bumper switch 117R detects the bump first, followed by the left bumper switch 117L, due to the compliance of the bumper 115 and the position of the bumper switches 117R and 117L. This way, the bump angle can be approximated with only the two bumper switches 117R and 117L. The robot 100 can also use the wall following sensors 113 to estimate the angle that the robot 100 turns in order to move in a direction parallel to the obstacle. The wall following sensors 113 are time-of-flight sensors that can identify a distance from an obstacle. The controller (which will be described in more detail below) can respond to the data of the wall following sensors such that either of the lateral sides L and R of the robot 100 are a set distance from the obstacle as the robot 100 moves in the forward direction F.

While the bumper 115 has been shown to include the bumper switches 117R and 117L to collect information about contact with obstacles, in other implementations, it should be understood an alternative bumper can be used to contact obstacles and physical structures in the environment. For example, as briefly described above, a capacitive contact sensor can be used to detect the contact point of the bumper 115 as the bumper 115 contacts a physical structure of the environment. Based on the contact, the robot 100 can re-orient to execute WALL FOLLOWING behavior, as will be described in more detail below.

Control System Mapping and Localization Computation

To perform SLAM techniques, the memory storage element 195 can include modules that acquire data related to SLAM. For example, the memory storage element 195 includes a pose module 198a, a mapping module 198b, and a signature module 198c. Each module collects and stores data related to mapping the environment and localizing the robot 100 using detectable landmarks within the environment. As will be described with each module, the data generated by the modules includes data indicative of traveled unique path segments within the environment that are recognizable landmarks (e.g., unique landmarks for re-localization), data indicative of a physical layout of the environment (e.g., occupancy grid), and data indicative of a calculated robot pose (e.g., estimated pose). The data can include odometry data from, for example, the encoders 112a-b, the optical mouse sensor 133, and the IMU 134. The modules further can include pre-programmed data such as pre-loaded maps and landmark templates.

The control system 149 allows the robot 100 to estimate its pose in the environment using the pose module 198a. In one example, during execution of the pose module 198a, the controller 190 of the control system 149 implements a dead reckoning process to estimate the pose of the robot 100.

Referring briefly back to FIG. 1B, the controller 190 can use the encoders 112a-b to track the distance traveled by the robot 100. The controller 190 can improve the accuracy of drift or wheel slippage associated with the dead reckoning data by incorporating an optical mouse sensor 133 and/or an IMU 134. The optical mouse sensor 133 estimates the drift in the x and y directions. The controller 190 can utilize sensed linear acceleration from the 3-axis accelerometer of the IMU 134 to estimate the drift in the x and y directions as well and can utilize the 3-axis gyroscope of the IMU 134 to estimate the drift in the heading or orientation $\theta$ of the robot 100. The controller 190 can therefore combine data collected by the rotary encoders 112a-b, the IMU 134, and the optical mouse sensor 133 to produce improved estimates of the pose of the robot 100 at a given time.

Accurate over relatively short distances, dead reckoning is prone to drift over time. Drift errors can accumulate in dead reckoning measurements. Accumulated drift can affect both the distance computations and the heading computations. The controller 190 assigns an uncertainty value, a confidence value (inversely proportional to the uncertainty value), or an uncertainty covariance matrix, or some other value representative of the accumulated error for each pose that the controller 190 estimates using the pose module 198a. For example, as the robot 100 travels a farther linear distance, the controller 190 assigns an increasing uncertainty to the estimated (x, y) position of the robot 100, and as the robot 100 re-orients itself, the controller 190 assigns an increasing uncertainty to the estimated orientation $\theta$ of the robot 100. For each estimation of the pose, the estimation includes the position and orientation of the robot 100 as well as an uncertainty with the estimation. The robot 100 typically updates the estimation of its pose and the uncertainty in its estimation approximately every 10 milliseconds.

The mapping module 198b allows the controller 190 to generate a 2D grid of cells—an occupancy grid—to represent the physical layout of the environment. The occupancy grid generated includes data indicative of the physical layout of the area and represents both open areas and obstacles. The data indicative of the physical layout of the area can be understood to a virtual map of the physical layout. The occupancy grid includes a boundary of the environment and boundaries of obstacles therein, as well as the interior floor space traversed by the robot 100. As the robot 100 estimates its pose using the pose module 198a, the controller 190 determines and saves the grid coordinates of the robot 100 during its motion. The controller 190 further associates an uncertainty value with each pose. Each cell in the occupancy grid can be assigned a value indicating whether the cell is understood to be NON-TRAVERSABLE floor space and TRAVERSABLE floor space. Each cell of the grid can be assigned (x, y) coordinates based on a chosen origin (0, 0) cell in the environment. The chosen origin can be, for example, the charging dock of the robot 100 or a particular location in the room. Each cell can represent a square area with four sides. The sides of the cell coincide with the sides of other cells. The cells can have a side length between 1 and 100 cm. For example, the grid can be a grid of cells, each 10 cm×10 cm. The robot 100 stores the (x, y) coordinates of each cell traversed by the robot 100. During WALL FOLLOWING behavior, for example, the controller 190 can mark all cells under the footprint of the robot 100 as TRAVERSABLE cells and mark all the cells corresponding to the wall being followed as NON-TRAVERSABLE. As will be described later, the controller 190 can recognize specific sequence, combinations, groups, etc. of cells that represent features and landmarks of the structural elements in the environment (e.g., walls, obstacles, etc.). In one implementation, before determining the value of cells in the grid, the controller 190 can pre-set the values of all cells to be UNKNOWN. Then, as the robot 100 drives during WALL FOLLOWING behavior, the values of all cells along its path are set to TRAVERSABLE, the location of the cells being determined by the distance to the origin.

In one implementation, after walking the boundary, as part of the mapping module 198b, the controller 190 can perform a flood fill to set the values of all cells inside the boundary made up of TRAVERSABLE cells as TRAVERSABLE cells that can be traversed. The mapping module 198b can update the map on a periodic basis, such as after travelling a threshold distance (e.g., once every meter or half meter travelled by the robot 100), after a threshold period of time (e.g., once every 1-3 seconds), or after collecting a threshold number of pose points (e.g., greater than 20 points). The confidence value of the pose could be derived from the VSLAM system or from the distance traversed or rotation amount of the robot or by the mismatch between information given by the odometry and the other sensors (e.g., optical mouse, gyroscope) or any combination of these.

In some implementations, the mapping module 198b further recognizes landmarks and features based on sensor data accumulated by the sensor system 180. Although the mapping module 198b has been described to pre-set the cells in the grid to be UNKNOWN, in some cases, the mapping module 198b can pre-set the cells to be NON-TRAVERSABLE or TRAVERSABLE and update the cells as the robot 100 discovers additional mapping data about the physical layout of the environment.

The signature module 198c stores data relating to the location of edges of obstacles and walls and stores templates of path segments traversed in the environment as unique signatures, or landmarks. As the robot 100 navigates about the environment and stores its pose using the pose module 198a, the robot 100 can receive data from its sensor system 180 that indicates a unique path segment constituting a landmark, which the signature module 198c stores for future reference. Each unique signature can include the pose of the robot 100 at the start of navigating along the landmark. The unique signatures can further include pose data collected as the robot 100 travels along the landmark. As will be described later with respect to the RE-LOCALIZATION behavior, the unique signatures are recognizable landmarks that the robot 100 uses re-localize within the occupancy grid and reduce the error in estimating robot pose.

In implementations, the robot 100 stores the signature path segments, or landmarks, as the robot 100 follows obstacles and walls in the environment during WALL FOLLOWING behavior. In implementations, WALL FOLLOWING behavior constitutes the robot following portions of surfaces of structural elements, thereby defining walls, furniture, or other obstacles in the environment on the occupancy map, and in other implementations, WALL FOLLOWING behavior constitutes following all peripheral edges of a room, tracing walls that bound the space. As will be described later, the WALL FOLLOWING behavior implements the pose module 198a to store the estimated poses of the robot 100 as the robot 100 follows along surfaces within the environment. In one example, the robot 100 can travel along a wall aligned with north-south, and the controller 190 can implement the signature module 198c to assign a landmark corresponding to the poses indicative of the north-south wall. In another example, the robot 100 can travel along an outside corner and store the landmark corresponding to the poses indicative of the outside corner.

In implementations, the robot 100 can also derive the landmarks from inspecting the occupancy grid generated by the mapping module 198b. For example, after mapping a portion of the environment using the mapping module 198b, the controller 190 can perform a template matching algorithm on the occupancy grid to find physical landmarks and generate the unique signatures indicative of those landmarks. For example, the signature module 198c can recognize three or more adjacent NON-TRAVERSABLE cells as a physical landmark to be stored in the signature module 198c as a signature. If three cells form a line, the signature module 198c can recognize the line of cells as a straight wall. The orientation of the line of cells can correspond to the orientation of the wall. The signature module 198c can label the line of cells as a unique signature corresponding to the wall. In another example, the signature module 198c can recognize three NON-TRAVERSABLE cells as a corner, where the two adjacent sides of one cell are each touching one of the other two cells. If each cell also touches a TRAVERSABLE cell, the signature module 198c can label the three cells as a unique signature corresponding to an outside corner. If the sides of one of the cells do not touch a TRAVERSABLE cell, the signature module 198c can label the three cells as a unique signature corresponding to an inside corner. From the occupancy grid of the mapping module 198b, the controller 190 can generate a list of unique signatures that correspond to path segments within the environment, these path segments representing landmarks in the environment that the robot 100 has encountered during, for example, WALL FOLLOWING behavior or COVERAGE behavior. Other combinations of cells, including more or fewer cell groups, can indicate other features of the room, such as a curved wall or a sharp corner.

Figure 4A:
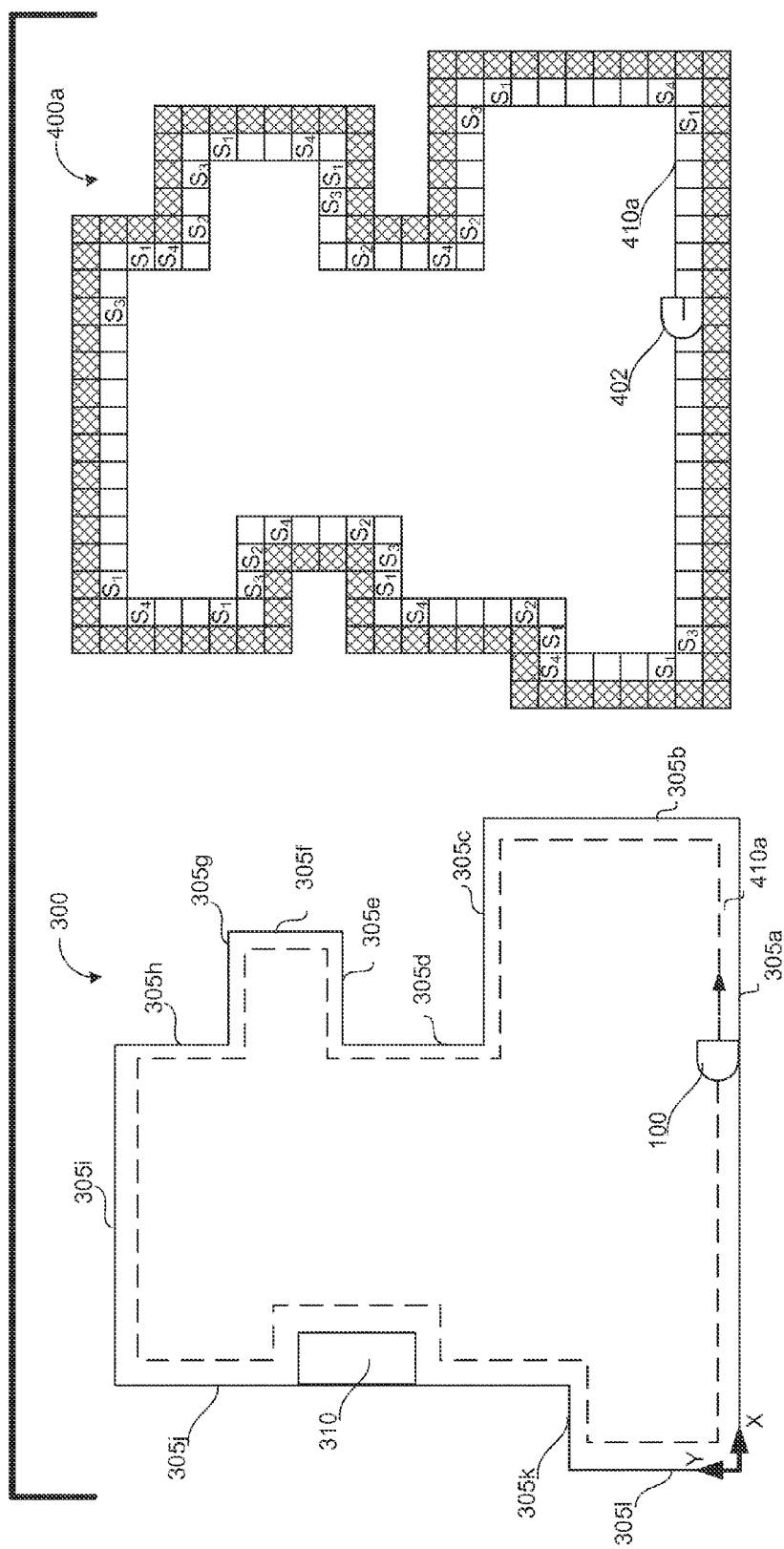
FIGS. 4A-C show the room and the autonomous robot of FIG. 3, different paths followed by the autonomous robot, and virtual maps corresponding to the room.
Figure 4B:
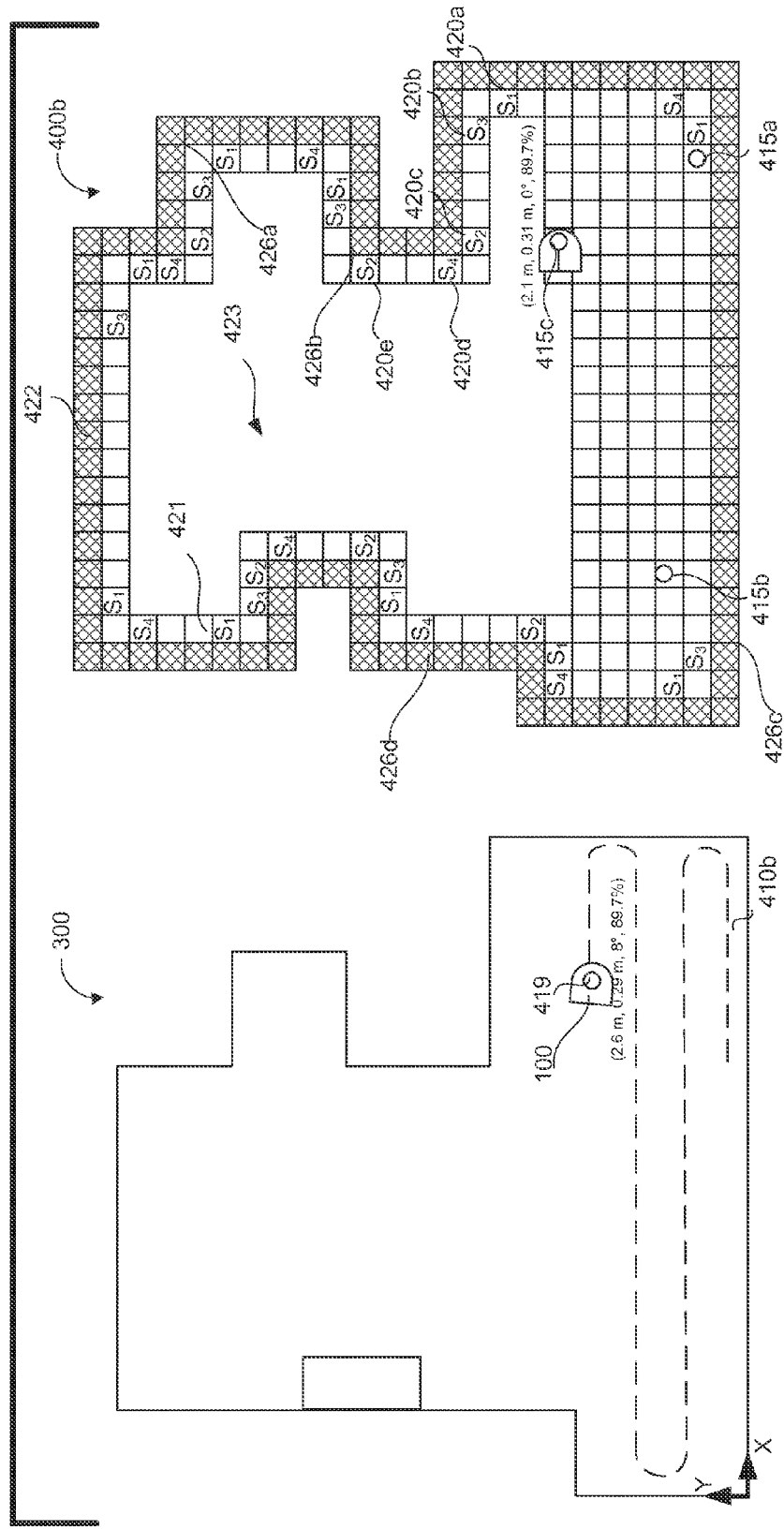

Referring briefly to FIG. 4B, which shows an example occupancy grid 400a that has been partially populated, white squares represent TRAVERSABLE cells 421, and hashed squares represent NON-TRAVERSABLE cells 422. Cells classified as neither TRAVERSABLE nor NON-TRAVERS- ABLE are represented as blank space, though it should be understood that the blank space can include cells to represent the UNKNOWN cells 423. As described above, three NON-TRAVERSABLE cells 422 can be recognized as one of several unique signatures, e.g., an inside corner 426a, an outside corner 426b, an X-axis path 426c, a Y-axis path 426d. In some cases, the three NON-TRAVERSABLE cells 422 can be the inside corner 426a. The cells marked by $S_1$ correspond to the beginning of the path adjacent to the inside corners of the room 300. The three NON-TRAVERSABLE cells 422 can be an outside corner 426b. The cells marked by $S_2$ correspond to the beginning of the paths adjacent to the outside corners of the room 300. The three NON-TRAVERSABLE cells 422 can be the X-axis path 426c. The cells marked by $S_3$ correspond to the beginning of the paths adjacent to the landmarks of the room 300 that are parallel to the X-axis. The three NON-TRAVERSABLE cells 422 can be the Y-axis path 426d. The cells marked by $S_4$ correspond to the beginning of the paths adjacent to the landmarks of the room 300 that are parallel to the Y-axis. Although the signatures have been described to include three NON-TRAVERSABLE cells, in some implementations, the signatures can include fewer or more NON-TRAVERSABLE cells. In some cases, the signatures can include TRAVERSABLE cells. For example, a narrow path in the environment can be a TRAVERSABLE cell flanked by NON-TRAVERSABLE cells on either side of the TRAVERSABLE cell.

Referring back to FIG. 1C, in the signature module 198c, the sensor data that the controller 190 associates with each unique signature can include database fields such as a signature ID, a landmark class, and a feature list. The signature ID field can be a value used to uniquely identify the signature from among other signatures stored in the signature module 198c.

The landmark class is a classification value that classifies the landmark represented by the signature. For example, landmark classes can include north-south wall, east-west wall, diagonal wall, inside corner, outside corner, rounded wall, protruding obstacle, and other curves and geometries that can be formed by obstacles and structural elements in the environment. In embodiments, these landmark classes can represent specific configurations of cells defined in the occupancy grid. In some examples, the signature module 198c can be pre-loaded with a library of specific templates that are found in the environment. As described above, specific templates can include templates representing sharp corners, inside corners, X-axis paths, and Y-axis paths. In other cases, the library of templates can include templates representing curved walls, narrow paths, acute angled walls, obtuse angled walls, and other geometries that can be found in the environment. In some cases, the templates that are pre-loaded can be user-uploaded or saved from a previous cleaning operation. As a result, upon implementing the signature module 198c, the controller 190 utilizes, for example, a template matching algorithm to search through the occupancy grid to find groups of cells that correspond to templates found in the library of templates. The controller 190 assigns a signature ID to each group of cells found using the template matching algorithm and also assigns a landmark class to each signature ID based on the template in the library of templates used to identify the signature.

The feature list can include sensor data. In implementations, the features can correspond to SIFT features. The robot 100 uses the sensor system 180, and in specific implementations, the bumper sensor, to observe the physical landmarks and generate a feature list corresponding to the sensor data associated with the walls, corners, obstacle surface contours, edges, curves and geometries that can be formed by obstacles and structural elements within the environment. The feature list can include associations with the processed data from the pose module 198a, timestamps from, for example, a computer's operating system time that can be used to store an indication of when the landmark was observed by the robot, and a timestamp of when the signature was added to the signature module 198c. When the controller 190 generates a signature of a landmark, the controller 190 can store the orientation (θ) of the robot as part of the signature as the sensors collect data associated with the physical structural elements corresponding to the landmark. For instance, the initial estimate of the pose of a landmark that is referenced in the global reference frame can correspond to the pose of the robot 100 when the robot 100 begins to initiate WALL FOLLOWING behavior to follow the edges or surfaces of a structural element (e.g., wall), an obstacle (e.g., furniture), or a collection of or structural elements and obstacles. The feature list for a landmark can further include a length, distance, a number of cells, a position of cells, or other values that can represent the characteristics of the (x, y) coordinates of the cells of the landmark. As a result, if the controller 190 identifies multiple landmarks having the same landmark class, the feature list for the specific landmark can distinguish these landmarks from one another. As will be described later, the signatures for each landmark generated by and stored in the signature module 198c can be used to re-localize the robot 100 to reduce the uncertainty that the robot 100 has in poses estimated by the pose module 198a.

The electromechanical systems and modules disclosed and illustrated herein may include the systems and modules as disclosed in U.S. publication No. 20110167574, filed Nov. 5, 2010, titled "Methods and systems for complete coverage of a surface by an autonomous robot," U.S. patent application Ser. No. 13/460,261, filed Apr. 30, 2012, titled "Robotic Vacuum," U.S. patent application Ser. No. 11/688,213, filed Mar. 19, 2007, titled "Robot Confinement," and U.S. Ser. No. 14/512,098 filed on Oct. 10, 2014 and titled "Robotic Lawn Mowing Boundary Determination," the disclosures of which are incorporated by reference herein in their entireties.

Robotic Behaviors

The memory storage element 195 further includes behaviors for the robot 100 that cooperate with the modules 198a-198c to perform SLAM techniques. The controller 190 can execute behaviors that implement one of or combinations of the modules and use the data collected by the modules to map the environment and regularly re-localize the robot 100 to the map of the environment. The behaviors include WALL FOLLOWING behavior, COVERAGE behavior, and RE-LOCALIZATION behavior.

1. Wall Following Behavior

In general, during WALL FOLLOWING, the robot 100 detects a wall, obstacle (e.g., furniture, breakfast bar, cabinet toe kick, etc.), or other structure (e.g. fireplace hearth, stair edge, etc.) in the environment using the bumper 115, follows the contours of the wall, obstacle or other structure, and then proceeds to generate a signature landmark using the signature module 198c corresponding to the data collected as the robot 100 follows part or all of the structural element. The data collected can represent a feature or landmark from the pose module 198a. In some examples, the robot 100 implements the wall following sensors 113 to perform the WALL FOLLOWING behavior. Upon initial contact with the wall, obstacle or other structural element, the robot 100 can rotate until the robot 100 is oriented such that the forward drive direction F of the robot 100 is parallel with a surface of the obstacle. In some cases, the wall, obstacle, or structural element can be curved such that the robot 100 follows a curved path as it move along the surface of the structural element. In such examples, the robot 100 can be oriented such that it is tangential to the surface of the structural element. As the robot 100 follows the structural element, the controller 190 engages the pose module 198a. The recorded sensor data, which can include a feature (e.g., a geometric feature) of the structural element, is stored as part of the signature corresponding to the geometric contours of the structural element and thus becomes a landmark entry in the signature module 198c database.

Using the bumper sensor, the controller 190 can implement WALL FOLLOWING behavior, where the robot 100 can make physical contact with an obstacle in the environment and re-orient the robot 100 such that the forward drive direction F of the robot 100 is parallel or tangential to the surface of the obstacle. The WALL FOLLOWING behavior allows the robot 100 to follow a path corresponding to the edges of the obstacle. For example, as described earlier, the controller 190 can interpret the time difference between the actuation of the right and left bumper switches 117L and 117R to determine the contact angle. The contact angle provides an estimate of the amount that the robot 100 needs to turn in order to align its forward drive direction F with the obstacle. The controller 190 can instruct the robot 100 to turn a fraction of the required turning angle and then continue in the forward drive direction F. Contacting the obstacle again triggers the bumper switches 117L and 117R again. The controller 190 can then estimate the contact angle and continue adjusting the orientation of the robot. Once the contact angle is below a certain amount, the controller 190 can instruct the robot to turn the full angle so that the forward drive direction F is parallel to the obstacle. The robot then proceeds to follow the wall in the WALL FOLLOWING behavior. In some implementations of the WALL FOLLOWING behavior, the controller 190 uses the wall following sensors to determine at what orientation to stop rotating the robot 100. When the wall following sensors determine that the side of the robot 100 is substantially parallel to the obstacle, the controller 190 ceases rotation. In another implementation, the controller 190 uses the wall following sensors to determine the orientation of the robot 100 that will cause the robot 100 to have a forward drive direction substantially tangential to the surface of the obstacle. In the case of curved surfaces, the controller 190 can use the tangential orientation to allow the robot 100 to follow along curve surface (e.g., cylindrical columns, curved walls, floor lamps, or other structural elements).

During WALL FOLLOWING behavior, the robot 100 can contact a second obstacle as the robot follows a first obstacle. For example, as the robot 100 follows a first wall in the forward drive direction F, the robot 100 can contact a second wall where the first wall meets the second wall at an inside a corner. Upon reaching that corner, the controller 190 re-orients the robot 100 (e.g. back up and turn 90 degrees) so that the robot 100 continues moving in the forward drive direction F along the second wall.

While the controller 190 implements WALL FOLLOWING, the controller 190 can continuously execute the pose module 198a, the mapping module 198b, and the signature module 198c. As the pose module 198a estimates the pose of the robot 100, the mapping module 198b can populate the occupancy grid with TRAVERSABLE cells corresponding to the traversed area beneath the robot 100 and NON-TRAVERSABLE cells corresponding to the obstacle or obstacles that the robot 100 is following. The signature module 198c can further recognize unique path segments that the robot 100 has followed during WALL FOLLOWING that can be identified as a landmark. For example, if the robot 100 goes around an outside corner during WALL FOLLOWING, upon completing the traversal of the path adjacent to the outside corner, the controller 190 can generate a signature corresponding to the sensed contours (e.g. number and placement of angles, number and placement of curves, and other measurable physical parameters (e.g. path length, path orientation, etc.) of the path, that signature being a recognizable landmark usable for re-localization of the robot 100.

2. Coverage Behavior

By way of general overview, COVERAGE behavior instructs the robot 100 to cover and clean the floor of the environment. The robot 100 can cover the floor surface of the environment using coverage path techniques known in the art, such as a boustrophedon or cornrow pattern, a spiral pattern, or a pseudo-random bounce coverage. As the robot 100 covers the floor, the controller 190 can implement the pose module 198a and the mapping module 198b to estimate the pose of the robot 100, generate the occupancy grid (e.g., the occupancy grids 400a-400c of FIGS. 4A-4C, which will be described in detail later), and estimate the uncertainty of the pose estimations. The coverage pattern can be one in which the robot is navigated to cover the area in sequential passes in which each subsequent pass follows an edge of a region cleaned on a previous pass (e.g., as a spiral or a cornrow pattern), rather than a pseudo-random bounce pattern.

As the robot 100 navigates the environment in COVERAGE behavior, the uncertainty of the controller 190 (shown in FIG. 1C) in the pose of the robot 100 may increase over time or distance travelled. If the uncertainty covariance computed by controller 190 increases to above a pre-determined threshold overall or individually in the x, y, or theta direction, the controller 190 can disable the mapping module 198b that modifies and updates the occupancy grid. The pre-determined threshold for uncertainty can be, for example, relative to the diameter of the robot in the x-y direction. The pre-determined threshold may be based on the standard deviation or covariance of the position of the robot. For example, since units of the standard deviation are the same as the units of the position of the robot, the pre-determined threshold can be computed based on the diameter of the robot. In some cases, the thresholds of a covariance matrix of the uncertainty can be set to a value relative to the diameter of the robot and the narrowest expected corridor or doorway in order to ensure the robot can properly navigate to any given landmark to re-localize. Exceeding the pre-determined threshold can cause the controller 190 to disable COVERAGE behavior and the mapping module 198b. As a result, the occupancy grid of the mapping module 198b can become frozen in the last known-good state and remains that way until the robot 100 is able to reduce uncertainty in its pose, at which time the controller 190 may resume adding occupancy data to the mapping module 198b. In some implementations, the robot 100 will shift the occupancy grid, or portions thereof to align with reliably re-encountered landmarks.

3. Re-Localization Behavior

When the pose uncertainty of the robot 100 increases above the pre-determined threshold, the controller 190 can implement the RE-LOCALIZATION behavior to reduce the uncertainty of the pose estimate and to generally compute a correction for the pose of the robot 100. The RE-LOCAL-IZATION behavior can be used by a SLAM process to correct for drift in the dead reckoning information.

Upon initializing the RE-LOCALIZATION behavior, the controller 190

(i) selects a landmark found in the signature module 198c to use for re-localization;
(ii) directs the robot 100 to the suspected physical location of the landmark;
(iii) upon sensing a bumper sensor event consistent with the geometric contours of the landmark, adjusts the pose of the robot to re-localize the robot 100 to the environment.

The controller 190 can consider a number of factors to select a landmark to use for re-localization. For example, the controller 190 can compute the suspected distance—for example, the geodesic distance or the navigable distance—between the current estimated location of the robot 100 and the location of the nearest landmarks and select the landmark at the shortest distance. The controller 190 can consider the duration of time that has elapsed since the controller 190 has recorded each landmark and select the most recently recorded landmark. The controller 190 can further consider the uniqueness of each landmark compared to other landmarks and select the most unique of the landmarks. Uniqueness can be measured by the number of other landmarks having the same landmark class. The number of landmarks having the same landmark class is inversely proportional the uniqueness. When the controller 190 selects a landmark, the controller 190 can compute an estimated distance to the landmark and an estimated angle of incidence with a geometric feature or contour of the landmark. The angle of incidence can correspond to an expected angle of contact with the obstacle that includes the geometric feature or the landmark. The controller 190 could also select a landmark depending on the relative uncertainty of the robot in a given direction—for example, if the uncertainty is above the threshold in the x direction the robot might select a landmark which will reduce the uncertainty in that direction, such as a wall that is orthogonal to the x direction.

The robot controller 190 can use a path planning algorithm known in the art—such as the A* algorithm or Dijkstra's algorithm—to direct the robot 100 to the suspected physical location of the landmark. These algorithms allow the robot 100 to avoid structure or walls that may intervene between the landmark the current position of the robot 100. In one implementation of a robot 100 having the moveable bumper 115, as the robot 100 moves toward the suspected physical location, the controller 190 can compute the contact angle based on an angle of contact with the bumper 115 as the bumper 115 contacts the structure represented by the landmark. Using the contact angle and the known contours of the landmark, the controller 190 can then compute the pose of the robot 100. The controller 190 can compare this computed pose with the estimated pose of the robot 100. Based on the difference between the estimated pose and the computed pose, the controller 190 adjusts the estimated pose of the robot 100 to re-localize the robot 100 within the environment and relative to global occupancy grid coordinates. The discrepancy between the computed pose and the estimated pose can then be used to update the map with this new information. This could involve shifting the most recent parts of the occupancy grid or GraphSLAM map. Examples of updating the map are described in U.S. application Ser. No. 13/632,997 filed on Oct. 1, 2012 and titled "Adaptive mapping with spatial summaries of sensor data," the content of which is hereby incorporated herein in its entirety.

Alternatively or additionally, the robot 100 can execute WALL FOLLOWING behavior to follow the geometric contours at the suspected physical location and to generate re-localization path data corresponding to these sensed contours. The robot 100 then compares the re-localization path data to the feature list of recorded landmarks and re-localize the robot 100 to the environment based on the difference between the re-localization path data and a landmark matching the identified geometric contours. After contacting the landmark, the controller 190 can proceed to WALL FOLLOWING behavior. The controller 190 can further record the angle of contact when the bumper switches 117L and 117R are triggered. The robot 100 proceeds to follow the surfaces or edges of the obstacle, wall or structure that triggered the bumper switches 117L and 117R and generates re-localization path data that can be used to determine if the obstacle, wall or structure corresponds to a landmark. The controller 190 can begin generating the re-localization path after triggering the bumper sensor system 135 a first time. As the controller 190 proceeds through the path adjacent to the obstacle, triggering the bumper sensor system 135 a second time can indicate to the controller 190 to finish generating the re-localization path. The controller can record the angle of contact for both the first and the second instances of triggering the bumper switches 117R, 117L.

The controller 190, after generating the re-localization path, can compare estimated values corresponding to the location of the landmark to actual values computed while the controller 190 generates the re-localization path. The controller 190 can analyze the approach to and navigation along the structural element corresponding to the landmark. In analyzing the approach, the controller 190 can compare an estimated approach angle with a contact angle computed using the bumper sensor system (using, e.g., the bumper 115). For example, the controller 190 can estimate the approach angle based on the location of the landmark and the estimated current pose of the robot 100. When the robot 100 contacts the landmark, the controller 190 can compute the angle of approach using the bumper sensors. The controller 190 can compare these two angles and utilize these two angles to re-localize the orientation $\theta$ of the robot 100 within the global coordinate system. During the approach, the controller 190 can further track the odometry and compare the odometry with an estimated distance to the structural element calculated using the estimated location of the robot 100. The robot 100 can bump into the structural element represented by the feature earlier than expected. The controller 190 can use the differences between odometry and the estimated difference to re-localize the (x, y) position of the robot 100.

In analyzing the navigation, the robot 100 can compare the poses estimated while generating the re-localization path to the poses stored in the landmark database. The difference between the poses, including x, y, and $\theta$ differences, can be used to re-localize each coordinate to the global coordinate system of the environment. The odometry along the re-localization path can be further compared to the odometry data associated with the landmark in the landmark database. If the a wall, obstacle or other structural element terminates at an intersection with another wall, obstacle or structural element, the contact angle between the robot with the subsequent obstacle can be compared with an angle associated with a landmark representing the intersection these two obstacles. For example, the robot 100 can select a landmark representing a first wall. After generating the re-localization path along the first wall, the robot 100 contacts a second wall and can determine the contact angle using, for example, the bumper 115. The robot then determines the difference between the contact angle and the angle between the first and second walls (as determined when the controller 190 implemented the signature module 198c during WALL FOLLOWING behavior).

In some implementations of the RE-LOCALIZATION behavior, the controller 190 can compare the re-localization path with the landmark and determine that a percent match between the re-localization path and the landmark is below a pre-determined threshold. The percent match can consider both the approach to and the navigation along the path segment constituting the landmark. If the percent match is below the match threshold, the controller 190 can reinitialize the RE-LOCALIZATION behavior for another landmark. The match threshold can be based on the confidence threshold (or, in some examples, the uncertainty threshold) used for disabling the COVERAGE behavior and enabling the RE-LOCALIZATION behavior. For example, the match threshold and the confidence threshold can be directly proportional such that a low confidence threshold results in a low match threshold and a high confidence threshold results in a high match threshold. The match threshold can be, for example, between 75% and 95%. When the controller 190 re-localizes the robot 100, the position of the robot 100 can be modified to match the re-localization scheme.

After successfully re-localizing the robot 100 to a first landmark, the robot 100 can initialize RE-LOCALIZATION behavior a second time for a second landmark known to be orthogonal to the first landmark. For instance, the first landmark may be aligned with the x- or y-axis. Such an alignment can result in a better re-localization for one of the two directions. As a result, after re-localizing to the first landmark, the controller can set one entry of the position to match the re-localization scheme. Repeating RE-LOCALIZATION behavior for a second signature orthogonal to the first landmark can allow the controller 190 to re-localize the robot 100 to better account for accumulated error or drift in the other coordinates, for example, x, y and $\theta$. The orthogonal signatures provide a 90° reference to re-localize the estimated orientation $\theta$ of the robot 100. Each signature further provides a reference for re-localizing each of the estimated position coordinates x, y. In some cases, the robot 100 can select a landmark representing an outside corner or an inside corner. The controller 190 can then choose to not repeat RE-LOCALIZATION behavior because the landmark can already be used to achieve the same restoration of pose confidence as using two orthogonal landmarks.

The robotic behaviors disclosed and illustrated herein may include the routines and behaviors as disclosed in U.S. patent application Ser. No. 13/790,643, filed on Mar. 8, 2013, and titled "Simultaneous Localization and Mapping for a Mobile Robot," which is herein incorporated by reference in its entirety. For example, the pose estimation, wall following, and pose confidence computations of the disclosure may also be alternatively implemented into the robotic systems of this application.

Navigation Flow Chart

Figure 2:
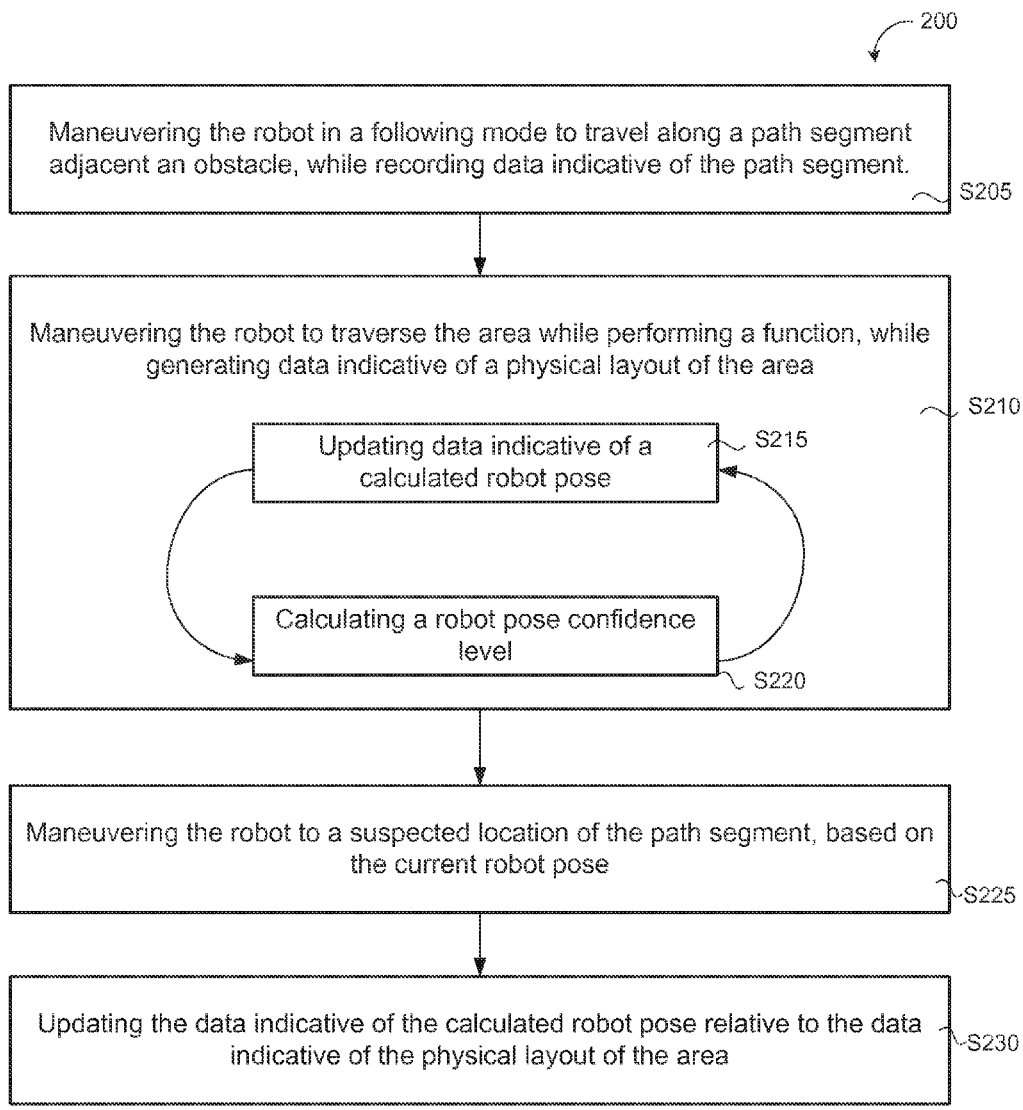
FIG. 2 shows a flow chart of navigating an autonomous robot.

The flow chart 200 of FIG. 2 shows a method of navigating an autonomous robot 100 within an area at least partially enclosed by walls. The method can include aspects of the navigation, mapping, localization, and other SLAM-related software and hardware described above with respect to FIGS. 1A-C.

In step S205, the controller maneuvers the robot 100 in a following mode to control the robot to travel along a path segment adjacent an obstacle and record data indicative of the path segment. To maneuver the robot 100 in the following mode, the controller can execute the FOLLOWING behavior that utilizes the bumper sensor system to navigate the robot around obstacles and physical elements of the area. The FOLLOWING behavior, can include execution of the pose module 198a, the mapping module 198b, and the signature module 198c. As described earlier, these modules 198a-c can cooperate to allow the robot 100 to record data indicative of the contours, length and/or directionality of the path segment adjacent the obstacle.

In step S210, the controller (e.g., the controller 190 of FIG. 1C) maneuvers the robot 100 in a coverage mode to control the robot 100 to traverse the area while the robot 100 performs a function. The controller also generates data indicative of a physical layout of the area, including area boundaries and obstacle perimeters detected while the robot performs the function. The controller can execute the COVERAGE behavior to maneuver the robot in the coverage mode. The robot, as a result, can traverse the area using one of the coverage patterns described earlier in relation to the COVERAGE behavior. The function performed by the robot can include a cleaning function executed by, for example, the cleaning system 155 of FIG. 1C. During COVERAGE behavior, the controller can instruct the robot to execute the pose module 198a and the mapping module 198b. The controller can utilize the mapping module 198b to generate the data indicative of the physical layout of the area, which can correspond to an occupancy grid stored on the memory storage element of the robot. The occupancy grid can denote the area boundaries and obstacle perimeters using markers indicating TRAVERSABLE or NON-TRAVERSABLE, as described in relation to the mapping module 198b.

While performing the step S210, the controller performs steps S215 and S220. In step S215, the controller updates data indicative of a current robot pose within the area. The current robot pose includes a current location and orientation of the robot relative to global coordinates of the area. The controller updates the data indicative of the current robot pose based on at least on robot odometry data. The pose module 198a can allow the controller to estimate the pose of the robot within the area. As part of updating the data indicative of the robot pose, the controller can update the data indicative of current robot location by comparing the data indicative of the path of the robot along the path segment to the data indicative of the path segment recorded in the following mode. The comparison can allow the robot to determine whether the path of the robot along the path segment sufficiently matches the path segment recorded in the following mode executed in the step S205. The controller, upon determining a sufficient match, can further update either of the data indicative of calculated robot location and the data indicative of the physical layout of the area, in accordance with the sufficiently matched path segment. In step S220, the controller calculates a robot pose confidence level. The confidence level can be computed based on estimated drift and error that may have accumulated during motion of the robot. The controller continues to perform the steps S215 and S220 until the robot pose confidence level falls below a predetermined confidence limit.

In step S225, in response to the robot pose confidence level being below a predetermined confidence limit, the controller maneuvers the robot to a suspected location of the path segment, based on the current robot pose. As the controller calculates the robot pose confidence level in the step S220, the controller can continuously compare the robot pose confidence level to the predetermined confidence limit. Upon detecting a robot pose confidence level that falls beneath the predetermined confidence limit, the controller can execute the RE-LOCALIZATION behavior to re-localize the robot. The RE-LOCALIZATION behavior can instruct the robot to select a signature, which includes a location and orientation of the path segment that the controller can use to maneuver the robot to the suspected location of the path segment. When the controller maneuvers the robot to the suspected location of the path segment, the controller can track the trajectory, the approach path, and, if the robot contacts an obstacle, the contact with the obstacle. After maneuvering the robot to the suspected location of the path segment, the controller can further maneuver the robot in the following mode to follow the path segment while the controller records robot pose data. The controller can also record bumper sensor data. From the recorded robot pose data, the controller can generate data indicative of a path of the robot along the path segment.

In step S230, in response to detecting the suspected location of the path segment, the controller updates the data indicative of the calculated robot pose relative to the data indicative of the physical layout of the area. After re-localizing the robot 100, the controller can direct the robot return to the position where its estimated pose confidence decreased to below the pre-determined confidence limit so that coverage resumes from that point.

Methods of Use

The methods, behaviors, and modules described above can be implemented for robotic devices in various situations and environments. For example, although the robot 100 has been described to be a cleaning robot with a cleaning system, in other implementations, the robot can be a robotic lawnmower or other autonomous robot that estimates its own location and generates maps of the regions it navigates. The example shown in FIGS. 3-4 depicts the implementation of the robot and the control system as discussed with respect to FIGS. 1-2.

Figure 3:
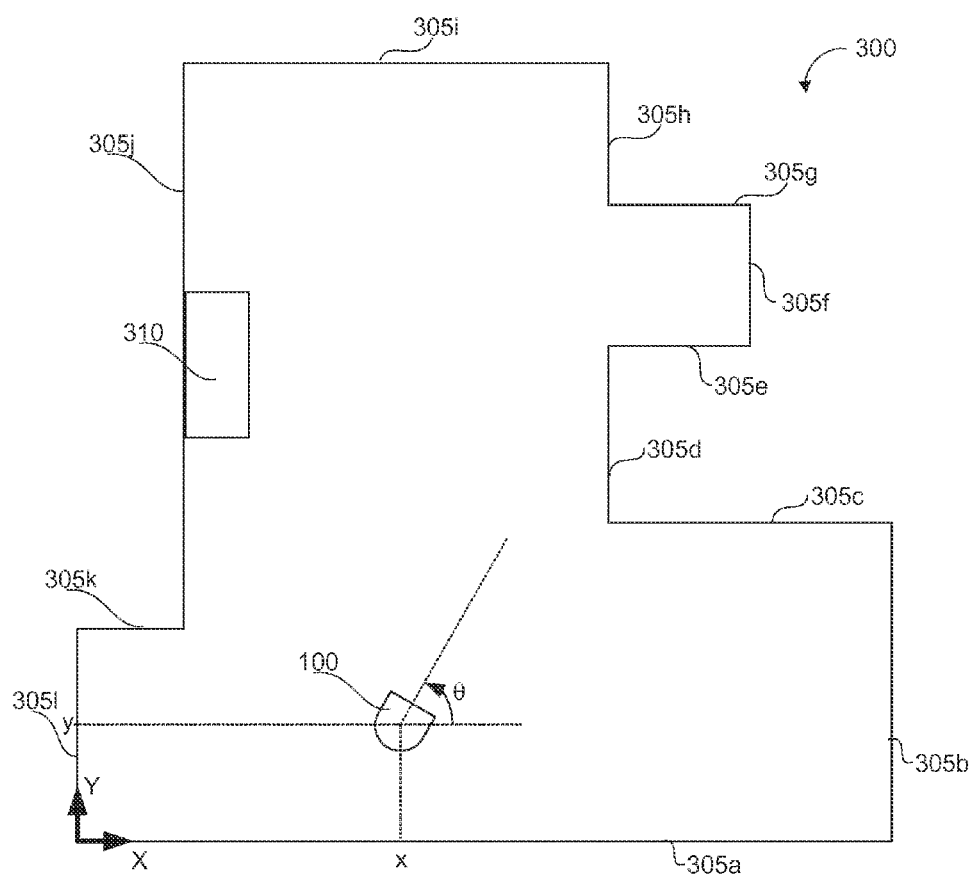
FIG. 3 shows a top view of an area with an autonomous robot.

Referring to FIG. 3, the robot 100 navigates through a room 300 with walls 305a-1 and a bookshelf 310. The global coordinate system is defined by the X- and Y-axes. The walls 305a, 305c, 305e, 305g, 305i, and 305k are parallel to the X-axis, and the walls 305b, 305d, 305f, 305h, 305j, and 305l are parallel to the Y-axis. The bookshelf 310 sits against the wall 305j. The robot 100 can estimate its pose within the global coordinate system, using the pose module 198a as discussed with respect to FIG. 1C. The estimated pose includes the position and the orientation of the robot 100. The position of the robot 100 within the global coordinate system is defined by x and y. The orientation of the robot is defined by $\theta$, as measured relative to the X-axis.

FIG. 4A shows the robot 100 in the room 300 of FIG. 3 as it executes WALL FOLLOWING behavior along the walls 305a-1 and a corresponding occupancy grid 400a that the controller (e.g., the controller 190 of FIG. 1C) of the robot 100 generates during WALL FOLLOWING behavior. A virtual robot 402 is the virtual representation of the robot 100 within the occupancy grid 400a. The center of the virtual robot 402 represents the estimated (x, y) position of the robot 100, and the line going from the center of the virtual robot 402 to the circumference represents the estimated orientation $\theta$ of the virtual robot 402.

The robot follows the path 410a around the room 300 to mark the non-traversable boundaries of the room. The walls 305a-1 and the bookshelf 310 define these boundaries. Referring briefly back to FIG. 1C, the controller of the robot 100 implements the mapping module 198b to generate the occupancy grid 400a. The occupancy grid 400a includes hatch marked cells to represent NON-TRAVERSABLE cells and white cells to represent TRAVERSABLE cells.

As the robot 100 performs WALL FOLLOWING behavior, the controller generates cells marked by the symbols $S_1$, $S_2$, $S_3$, or $S_4$, in the occupancy grid 400a of FIG. 4A. The cells marked by $S_1$ correspond to the beginning of the path adjacent to the inside corners of the room 300. The cells marked by $S_2$ correspond to the beginning of the paths adjacent to the outside corners of the room 300. The cells marked by $S_3$ correspond to the beginning of the paths adjacent to the landmarks of the room 300 that are parallel to the X-axis. The cells marked by $S_4$ correspond to the beginning of the paths adjacent to the landmarks of the room 300 that are parallel to the Y-axis.

In some implementations, the robot marks the non-traversable boundaries of the room by following the edge of an obstacle located away from the wall. For example, an obstacle or stationary object located within the room but away from the wall may be used as a landmark for re-localization.

FIG. 4B shows the robot 100 executing COVERAGE behavior. The robot 100 follows the path 410b. Referring briefly to FIG. 1C, the controller of the robot 100 implements the pose module 198a and the mapping module 198b to update the occupancy grid 400b as the robot navigates about the room 300. The controller of the robot 100 further implements the pose module 198a to compute the estimated pose of the robot 100 along the path 410b and the confidence with the estimated poses. The confidence can be computed as an average of the confidence of the robot 100 with each element of its pose.

Points 415a-c in the occupancy grid 400b represent estimations of the x, y location of the robot 100 as it navigates along the path 410b. The points 415a-c only represent a subset of the points generated along the path 410b. At each point 415a-c the robot 100 has a pose and pose confidence value (x, y, $\theta$, C, t), where x and y correspond to the estimated position of the robot 100 in the global coordinate system, $\theta$ corresponds to the estimated orientation of the robot 100 relative to the global coordinate system, and C corresponds to the average confidence of the robot 100. The points 415a-c also can have a corresponding timestamp t that can be used to compute odometry.

The point 415c corresponds to the end 419 of the path 410b. At the point 415c, the controller of the robot 100 estimates the pose of the robot 100, as represented by the virtual robot 402 in the occupancy grid 400b. The position of the robot 100 is estimated to be (2.1 m, 0.31 m). The controller estimates the orientation of the robot to be 0° (zero degrees) relative to the X-axis. The actual position of the robot 100 within the room 300 is (2.6 m, 0.29 m). The actual orientation of the robot 100 is 8° relative to the X-axis. As shown in FIG. 4B, the confidence at the point 415c is 89.7%, which is below the pre-determined confidence threshold, which, in this example, is 90%. Because of the pose confidence level falls below a threshold value, at the end 419 of the path 410b, the robot 100 disengages COVERAGE behavior and proceeds to RE-LOCALIZATION behavior, as will be described with respect to FIG. 4C.

Figure 4C:
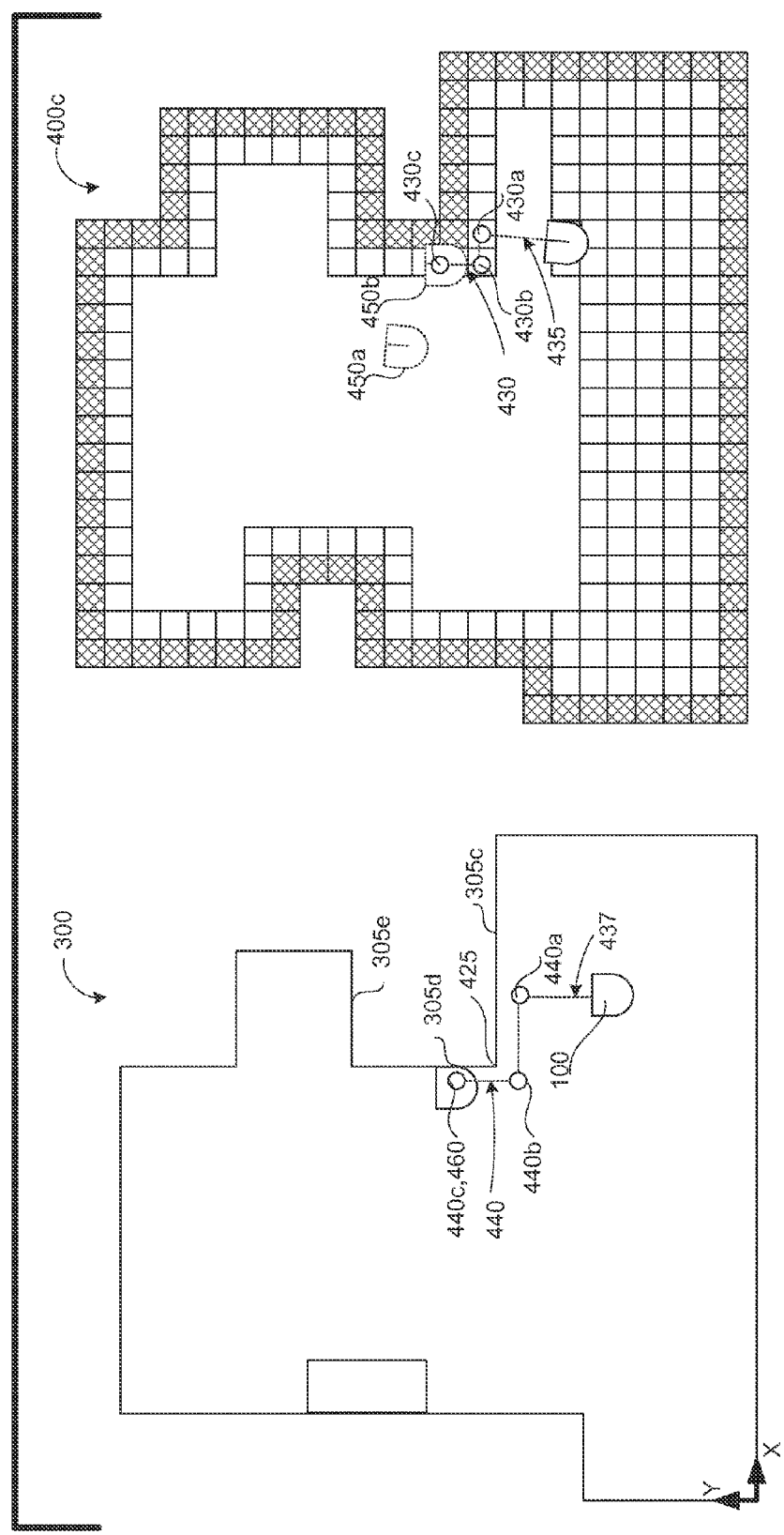

FIG. 4C shows the robot 100 executing RE-LOCALIZATION behavior to restore the confidence of the robot 100 in its estimated pose. Referring briefly to FIG. 1C, the robot 100 uses the pose module 198a to estimate the current pose of the robot 100 as the controller (e.g., the controller 190 of FIG. 1C) implements the RE-LOCALIZATION behavior.

The controller of the robot 100 can also disable the mapping module 198b so that the controller does not continue to update the occupancy grid while the pose confidence is below the confidence threshold. The controller of the robot 100 accesses the signature module 198c to find a preferred landmark database entry corresponding to a landmark to which the controller can navigate the robot 100.

In the example as shown in FIG. 4C, the robot 100 is physically located at the location shown in the room 300, and the controller of the robot 100 estimates the position of the robot 100 to be where the virtual robot 402 is shown in the occupancy grid 400c. In FIG. 4C, the virtual robot 402 corresponds to the initial position of the virtual robot before starting RE-LOCALIZATION behavior. Based on the position of the virtual robot 402, the controller of the robot 100 estimates the five landmarks 420a-e (labeled in FIG. 4B) to be in closest proximity to the position of the virtual robot 402. Based on factors such as suspected distance and uniqueness, as described above, the controller selects the landmark 420c, which is physically manifested as an outside corner 425 in the room 300. The controller generated the landmark 420c during WALL FOLLOWING when the controller had a high confidence in its pose. As a result, a landmark path 430 matches well with the physical path adjacent to the outside corner 425. The landmark path 430 along the outside corner 425 includes a start point 430a, a turning point 430b, and an end point 430c.

Based on the landmark path 430 and the location of the virtual robot 402, the controller can estimate a suspected approach contact angle θs as the robot 100 approaches the wall 305c. The controller selects a trajectory 435 to move toward a suspected location of the start point 430a of the landmark path 430 using a path planning algorithm as mentioned earlier. The controller bases the trajectory 435 based on where it has estimated the start point 430a to be and where it has estimated the virtual robot 402 to be. The robot 100 moves along an actual trajectory 437. When the robot 100 contacts the wall 305c, the controller can compute an actual approach contact angle $\theta_A$. using the bumper sensor system of the robot 100.

The controller marks the contact point with the wall 305c as a start point 440a of a re-localization path 440. The robot 100 turns to move along the wall 305c toward the outside corner 425. When the controller determines that the robot 100 has traversed the wall 305c, the robot 100 turns to move parallel to the wall 305d. The controller can determine that the robot 100 has traversed the wall 305c by, for example, using the bumper of the robot 100 as a tactile way of sensing that the wall 305c is no longer adjacent to the wall 305c. As the robot 100 progresses along the wall 305c, the robot 100 can deliberately turn toward the wall 305c to check that the wall 305c is still adjacent.

The controller marks a turning point 440b as the point at which the robot 100 turns to move along the wall 305d. As the signature path 430 of the landmark has indicated that the wall 305c is substantially perpendicular to the wall 305d, the controller instructs the robot to turn 90°. The controller then instructs the robot 100 to progress along the wall 305d. A number of events can trigger the controller to direct the robot 100 to stop progressing along the wall 305d. For example, the controller can stop progressing if the distance travelled as measured from the start point 440a has exceeded the path length stored in the signature of the outside corner 425. The controller marks the stopping location with an end point 440c that terminates the re-localization path 440.

The controller can compare the parameters calculated from the re-localization path 440 with the parameters of the landmark path 430. The controller can compare assumed approach contact angle θs to the actual approach contact angle $\theta_A$ and can use the difference in the assumed approach contact angle θs and the actual approach contact angle $\theta_A$ to restore confidence in the estimation of the orientation of the robot 100. The controller can calculate (i) the distance between the start point 440a and the turning point 440b of the re-localization path 440 and (ii) the distance between the start point 430a and the turning point 430b of the signature path 430. The controller can compare these two distances and use the difference between the two distances to restore confidence in the estimation of the x position of the robot 100. The controller can calculate (i) the position difference between the start point 440a of the re-localization path 440 and the start point 430a of the signature path 430 or (ii) the position difference between the turning point 440b of the re-localization path and the turning point 430b of the signature path 430. The controller can use the difference between the two positions to restore confidence in the estimation of the y position of the robot 100.

From the comparisons above, the controller can correct the pose (x, y, θ) of the virtual robot 402 and restore the confidence C. The virtual robots 450a-b shown in FIG. 4C correspond to the final positions of the virtual robot. A pre-localization final position 450a of the virtual robot and a post-localization final position 450b are shown in the occupancy grid 400c. The post-localization final position 450b better matches with the actual final position 460 of the robot 100. The controller may then update parts of the map to better match with the new corrected position. In one implementation, where the full occupancy grid is comprised of many overlapping sub-grids, the relative position of these sub-grids may be updated. In another implementation, the controller may update the position of the robot within a GraphSLAM pose constraint graph. Such techniques are described in U.S. application Ser. No. 13/632,997 filed on Oct. 1, 2012 and titled "Adaptive mapping with spatial summaries of sensor data." The controller can then enable COVERAGE behavior and the mapping module 198b. After re-localizing the robot 100, the controller can re-direct the robot 100 to the position where it disabled the COVERAGE behavior, as shown in FIG. 4B. The robot 100 can continue the cycle of COVERAGE behavior and RE-LOCALIZATION behavior until the controller has determined that the robot 100 has covered the room 300.

Alternative Implementations

The methods and systems described above can include several alternatives or additions that bestow different features and advantages.

The robot can further include other sensors known in the art to be beneficial for mobile robots. For example, the bumper sensor can advantageously include a pressure-based or capacitance based sensor, as disclosed in the U.S. patent application No. PCT/US2013/031264, filed on Mar. 14, 2013, and titled "Compliant Solid-State Bumper for Robot," the contents of which are incorporated by reference in their entirety. The robot can further include a camera to capture images of 3D features in the environment. The images can be used for VSLAM.

While WALL FOLLOWING behavior has been described to be facilitated by using differential actuation of the bumper switch 117L and 117R, in other implementations, the robot can additionally or alternatively use specific wall following optical sensors. As the robot move along the wall, the wall following optical sensors determine that the robot moving along a path parallel to the wall.

While covering a floor area has been described to be achieved using a boustrophedon pattern, a cornrow pattern, or a pseudo-random path, in other implementations, the robot can use a spiral pattern. The robot can use a combination of the patterns. In one example, the robot decomposes an area into multiple regions and implements a different pattern in each region.

While the feature list of a signature has been described to include a pose, a timestamp, and a confidence, the feature list can further include a "Last Observed Time" so that the robot can determine when the most recent signature was generated. The signature can also include a field that stores a timestamp that indicates the last time that the corresponding landmark information was updated. The signature can include a separate "Landmark Pose" field that stores a globally-referenced robot pose corresponding to when the landmark was created or updated to the database.

The feature list can further include information gathered by other sensors on the robot. For example, in some cases, the robot can re-localize to a cliff or drop-off in the room. As a result, the signature can include cliff sensor data that distinguishes the cliff or drop-off from other structures in the room. While the obstacles of the room have been described to be wall or structural element, it should be understood that, if cliff sensor data is further incorporated into the SLAM system, the physical elements can include the absence of floor beneath the robot (e.g., a cliff), a change in floor characteristics (e.g., going from carpet to tile), or other features that the cliff sensors can detect.

In one implementation, the SLAM system can discontinue adding new landmarks to the database in response to a predetermined number of entries, a predetermined density of entries, or a predetermined amount of time. For example, the SLAM system can discontinue landmark creation in a portion of an environment or in the entire environment at least partly in response to a determination that the landmark density has exceeded a predetermined threshold, such as 5-10 landmarks per square meter. For example, when a database for an environment exhibits relatively high landmark density in one portion of the environment and a relatively low landmark density in another portion of the environment, the addition of new landmarks to the database can be disabled for the portion of the environment corresponding to the relatively high landmark density in the database, and the addition of new landmarks can be enabled for portions of the environment corresponding to the relatively low landmark density.

When the controller re-localizes the robot, the re-localization has been described to adjust the pose (x, y, and theta) once one or more signature matches occur. Alternatively, the cells of the occupancy grid or map can be adjusted such that they are rotated to align with the new localization scheme. For example, in a GraphSLAM-based map, the edges between cells can be adjusted based on the signature matches."

The occupancy grid has been described to include TRAVERSABLE and NON-TRAVERSABLE cells. In some implementations, the occupancy grid can further include BOUNDARY cells that represent cells between the TRAVERSABLE and NON-TRAVERSABLE areas. These cells can generally correspond to the cells covered during WALL FOLLOWING behavior.

While the templates have been described to be overlaid on three cells (e.g., three cells for a wall, an inside corner, or an outside corner), in some implementations, the template can include four or more cells. The templates can include both TRAVERSABLE, NON-TRAVERSABLE, and—in the case that the occupancy grid uses BOUNDARY cells-BOUNDARY cells.

While the controller 190 has been described to consider a number of parameters in selecting a landmark for re-localization of the robot 100, in some implementations, the controller arbitrarily picks a landmark from the signature module. In other implementations, the controller can consider other factors such as the confidence of the robot pose when the controller generated the landmark.

As mentioned earlier, in some cases, if the comparisons made by the controller result in a large discrepancy that is below a percent match threshold, the controller instructs the robot to seek out landmark. In such an example, the robot may decrease the confidence threshold and the match threshold to increase the likelihood that the controller finds a suitable match between a re-localization path and a localization path.

While the RE-LOCALIZATION behavior has been described to direct the robot to the start point of the landmark paths, in some implementations, the RE-LOCALIZATION behavior can direct the robot to the end point of the signatures. In such an implementation, the controller can re-compute expected poses along the path corresponding to the landmark path. For example, the controller may need to modify the expected orientation of the robot along the path.

While the confidence has been described as a combined evaluation of the confidence of location and orientation coordinates (x, y, and θ) of the robot, in some implementations, a confidence can be assigned to each element of the estimated robot pose. For example, if the confidence of one of the elements decreases below the pre-determined confidence threshold, the robot can disable the mapping module and COVERAGE behavior and proceeds to RE-LOCALIZATION behavior. In other cases, the confidence is estimated from two of the elements.

While the pose has been understood to include x, y, and θ, in some implementations, the robot may be able to determine an altitude z. The environment may have altitude characteristics as well, and the robot can use these characteristics to re-localize the robot.

The SLAM systems disclosed herein may include aspects of other SLAM systems known in the art. For example, the algorithms and structures used in VSLAM system of the disclosure from U.S. application Ser. No. 10/739,902, filed on Dec. 17, 2003, and titled "Systems and methods for using multiple hypotheses in a visual simultaneous localization and mapping system" can be implemented into the SLAM systems described in this application. This disclosure is incorporated by reference in this application.

While a number of examples have been described for illustration purposes, the foregoing description is not intended to limit the scope of the implementations disclosed herein. There are and will be other examples and modifications within the scope of the following claims.

What is claimed is:

1. A method of navigating an autonomous robot within an area at least partially enclosed by walls, the method comprising:
maneuvering the robot in a following mode in which the robot is controlled to travel along a plurality of path segments adjacent an obstacle, while
generating data indicative of a physical layout of the area including area boundaries and obstacle perimeters detected while maneuvering the robot in the following mode, and recording data indicative of the plurality of path segments, the data being indicative of locations of the plurality of path segments relative to the physical layout of the area;

maneuvering the robot in a coverage mode in which the robot is controlled to traverse the area while performing a function, while updating data indicative of a robot pose relative to the physical layout of the area based at least on robot odometry data, the robot pose comprising a calculated location and orientation of the robot within the area, and calculating a robot pose confidence level; and in response to the robot pose confidence level being below a predetermined confidence limit:

selecting a trajectory of the robot to approach a suspected location of a path segment of the plurality of path segments based on the data indicative of the locations of the plurality of path segments and the data indicative of the robot pose;

maneuvering the robot along the selected trajectory toward the suspected location of the path segment; and then, in response to detecting the path segment within a predetermined distance from the suspected location of the path segment, updating at least one of the data indicative of the robot pose and the data indicative of the physical layout of the area, thereby updating the calculated location and orientation of the robot within the area.

2. The method of claim 1, wherein selecting the trajectory comprises selecting the path segment from the plurality of path segments based on a time differential from a first traversal of the suspected location of the path segment.

3. The method of claim 1, wherein selecting the trajectory comprises selecting the path segment from the plurality of path segments based on a distance differential from a first traversal of the suspected location of the path segment.

4. The method of claim 1, wherein updating the at least one of the data indicative of the robot pose and the data indicative of the physical layout of the area comprises re-localizing two or more of the plurality of path segments to the data indicative of the physical layout of the area.

5. The method of claim 1, wherein updating the at least one of the data indicative of the robot pose and the data indicative of the physical layout of the area comprises re-localizing the data indicative of the robot pose to the data indicative of the physical layout of the area.

6. The method of claim 1, wherein recording the data indicative of the plurality of path segments includes collecting data from a sensor on the robot.

7. The method of claim 6, wherein the sensor is at least one of an odometer, a radiation transceiver, a bump sensor, a pressure sensor, and a proximity sensor.

8. The method of claim 1, further comprising, after maneuvering the robot to the suspected location of the path segment:

maneuvering the robot in the following mode to follow the obstacle while recording robot pose data; and from the recorded robot pose data, generating data indicative of a path of the robot along the obstacle, wherein updating the at least one of the data indicative of the robot pose and the data indicative of the physical layout of the area comprises comparing the data indicative of the path of the robot along the obstacle to data indicative of the path segment recorded in the following mode, to determine whether the path of the robot along the obstacle matches the path segment recorded in the following mode; and upon determining a match, updating either of the data indicative of the robot pose and the data indicative of the physical layout of the area based on comparing the data.

9. The method of claim 8, wherein comparing the data comprises comparing at least one of path lengths, starting poses of the data, ending poses of the data, straight distances traveled, and curvatures.

10. The method of claim 1, wherein detecting the path segment comprises physically contacting the obstacle.

11. The method of claim 1, wherein generating data indicative of the physical layout of the area comprises analyzing image data from a camera on the robot.

12. The method of claim 1, wherein recording the data indicative of the plurality of path segments further comprises building a library of the plurality of path segments in the following mode, and wherein, in response to the robot pose confidence level being below the predetermined confidence limit, the robot is maneuvered to the suspected location of the path segment selected from the library as a function of the suspected location relative to the robot pose.

13. The method of claim 1, wherein recording the data indicative of the plurality of path segments further comprises building a library of the plurality of path segments based on the data indicative of the physical layout of the area, and wherein, in response to the robot pose confidence level being below the predetermined confidence limit, the robot is maneuvered to the suspected location of the path segment selected from the library as a function of the suspected location relative to the robot pose.

14. The method of claim 1, further comprising:

after updating at least one of the data indicative of the robot pose and the data indicative of the physical layout of the area, again maneuvering the robot in the coverage mode.

15. The method of claim 1, further comprising:

in response to detecting another obstacle while maneuvering the robot in the coverage mode, initiating the following mode.

16. The method of claim 1, wherein the function comprises cleaning a floor within the area.

17. The method of claim 1, wherein the plurality of path segments includes a path segment along a corner defined by the walls.

18. The method of claim 1, wherein selecting the trajectory comprises selecting an approach angle to navigate to the suspected location of the path segment.

19. The method of claim 1, wherein selecting the trajectory comprises estimating distances from the robot pose to the locations of the plurality of path segments, and selecting the path segment based on the estimated distances, the path segment having a shortest of the estimated distances.

20. The method of claim 1, wherein selecting the trajectory comprises selecting an approach path from a current location of the robot to the suspected location of the path segment.

* * * * *